United States Patent [19]

Leung et al.

[11] Patent Number: 5,444,697
[45] Date of Patent: Aug. 22, 1995

[54] METHOD AND APPARATUS FOR FRAME SYNCHRONIZATION IN MOBILE OFDM DATA COMMUNICATION

[75] Inventors: Cybil S. Leung, Richmond; William D. Warner, Maple Ridge, both of Canada

[73] Assignee: The University of British Columbia, Vancouver, Canada

[21] Appl. No.: 104,563

[22] Filed: Aug. 11, 1993

[51] Int. Cl.$^6$ ............................................. H04J 11/00
[52] U.S. Cl. ................................... 370/19; 370/69.1; 370/100.1; 375/362
[58] Field of Search ............ 370/69.1, 20, 21, 23, 370/70, 74, 50, 121, 19, 100.1, 74; 375/98, 111, 97, 38; 455/59, 71, 54.1

[56] References Cited

U.S. PATENT DOCUMENTS

| | | | |
|---|---|---|---|
| 4,101,738 | 7/1978 | Bellanger et al. | 370/74 |
| 4,438,511 | 3/1984 | Baran | 370/19 |
| 4,847,880 | 7/1989 | Karmerman et al. | 375/111 |
| 4,881,241 | 11/1989 | Pommier et al. | 375/38 |
| 5,012,491 | 4/1991 | Iwasaki | 375/97 |
| 5,063,574 | 11/1991 | Moose | 375/27 |
| 5,170,413 | 12/1992 | Hess et al. | 375/38 |
| 5,191,576 | 3/1993 | Prommier et al. | 370/18 |
| 5,228,025 | 7/1993 | Le Floch et al. | 370/20 |
| 5,274,629 | 12/1993 | Helard et al. | 375/38 |

FOREIGN PATENT DOCUMENTS 0008521 3/1980 European Pat. Off. .
0529421A2 3/1993 European Pat. Off. .

OTHER PUBLICATIONS

B. Hirosaki, A 19.2 kbps voiceband data modem based on orthogonally multiplexed QAM techniques, 1985, pp. 21.1.1–21.1.5.

W. E. Keasler, Reliable Data Communication Over the Voice Bandwidth Telephone Channel Using Orthagonal Frequency Division Multiplexing, University of Illinois, 1982.

P. H. Moose, Differential modulation and demodulation of multi-frequency digital communications signals, in Milcom 90, pp. 273–277 or 12.4.1–12.4.5, Oct., 1990.

E. F. Casas and C. Leung, A simple digital fading simulator for mobile radio, IEEE Transactions on Vehicular Technology, vol. 39, pp.205–212, Aug., 1990.

P. G. Moore and E. A. C. Shirley, Standard Statistical Calculations. New York: John Wiley & Sons, 1972.

(List continued on next page.)

*Primary Examiner*—Melvin Marcelo
*Assistant Examiner*—Chau T. Nguyen
*Attorney, Agent, or Firm*—Oyen Wiggs Green & Mutala

[57] ABSTRACT

A method and apparatus are disclosed for achieving symbol (frame) synchronization of digital data in an OFDM channel such as an OFDM/FM radio link. The method and apparatus are suitable for use in a pure ALOHA environment because synchronization is achieved on a frame-by-frame basis. The required bandwidth overhead is less than 10%. The bit-error-rate performance achievable with this technique is within 1.5 dB of the performance assuming ideal synchronization. The method and apparatus provide a three-stage synchronization process. First the onset of an ODFM frame is detected. Second, coarse synchronization is achieved by sampling the received signal, and measuring the correlation between the received signal and a reference signal. Coarse synchronization provides synchronization to within $\pm\frac{1}{2}$ sample period. The correlation is preferably carried out in the frequency domain after carrying out a Fast Fourier Transform on the sampled signal data. Third, synchronization is achieved by calculating the time-shift between the coarse synchronization point and the actual synchronization point and using the calculated time shift to determine the phase correction to apply to each data carrying sub-carrier. Finally the transmitted data is recovered by decoding the information obtained about the phase and amplitude of the data-carrying sub-carriers.

16 Claims, 19 Drawing Sheets

OTHER PUBLICATIONS

D. C. Cox, A Radio System proposal for Widespread Low-Power Tetherless Communications, IEEE Transactions on Communication, vol. 39, pp.324–335, Feb., 1991.

L. J. Cimini, Analysis and simulation of a digital mobile channel using orthogonal frequency division multiplexing, IEEE Transactions on Communications, vol. COM-33, pp. 665–675, Jul. 1985.

E. Casas and C. Leung, OFDM for Data Communication over Mobile Radio FMChannels, Part I: Analysis and Experimental Results, IEEE Transactions on Communications, vol. 39, pp. 783–793, May 1991.

B. R. Salzberg, Performance of an efficient parallel data transmission system, IEEE Transactions on Communications Technology, vol. COM-15, pp. 805–811, Dec. 1967.

S. B. Weinstein and P. M. Egert, Data Transmission by frequency-division multiplexing using the discrete Fourier transform, IEEE Transactions on Communications Technology, vol. COM-19, pp. 628–634, Oct., 1971.

J. A. C. Bingham, Multicarrier modulation for data transmission: An idea whose time has come, IEEE Communications Magazine, pp. 5–14, May, 1990.

Electronic Industries Association, Minimum standards for land mobile communiction FM or PM receivers, 25–947 MHz, Feb. 1970. EIA Standard RS–152–B.

Electronic Industries Association, Minimum standards for land mobile communication FM or PM receivers, 25–947 MHz, Jan. 1982. EIA Standard RS–204–C.

Electronic Industries Association, Minimum standards for portable/personal radio transmitters, receivers, and transmitter/receiver combination land mobile communications FM or PM equipment, 25–1000 MHz, May 1979. EIA Standard RS–316–B.

Abraham Peled and Antonio Ruiz, *Frequency Domain Data Transmission using Reduced Computational Complexity Algorithms*, ICASSP 80 Proceedings, vol. 3 of 3, 2 May, 1980 964–967.

METHOD AND APPARATUS FOR FRAME SYNCHRONIZATION IN MOBILE OFDM DATA COMMUNICATION

FIELD OF THE INVENTION

This invention relates to a method and apparatus for synchronizing data frames being transmitted over an Orthogonal Frequency Division Multiplexing (OFDM) channel such as an OFDM/FM radio link. The method and apparatus have particular application for communicating with mobile data receivers in an asynchronous pure ALOHA system in an urban environment where signal fading is a problem.

BACKGROUND OF THE INVENTION

Digital communication with mobile receivers is becoming increasingly significant with the proliferation of cellular telephones and mobile data terminals in our society. This trend is likely to continue. Some advantages of digital communication over analog communication are: Improved utilization of the radio spectrum; Increased reliability in communicating information which is very sensitive to channel errors; Direct access to computerized databases; The relative ease of protecting confidentiality and integrity by the use of encryption techniques; and Integration of voice and data services.

In most urban and many suburban areas, a major obstacle to achieving efficient and reliable data communication over a VHF or UHF mobile radio channel is multipath propagation. Multipath propagation results in severe and rapid fluctuations in the received signal strength as the mobile receiver is moved. The duration of a fade depends on the velocity of the receiver and is typically on the order of a few milliseconds.

The rate of fluctuation in the strength of the received signal is characterized by the Doppler rate $f_d$ which is given by $f_d = f_c v/c$, where $f_c$ is the carrier frequency, v is the vehicle speed, and c is the velocity of light.

The variation in amplitude of a received fading signal is well approximated by a Rayleigh distribution over short distances of a few tens of meters. Consequently, fading caused by multipath propagation of a signal is called Rayleigh fading. Over larger distances, shadowing of the received signal by hills and other large obstacles results in a log-normal variation in the mean of the Rayleigh distribution. Rayleigh fading imposes severe constraints on digital communication.

In a conventional serial modulation scheme data bits are transmitted over a channel sequentially. If a deep fade occurs during the transmission of such a signal then the bits which are transmitted during the deep fade may not be received. This problem can be reduced by transmitting a data frame containing a block of bits in parallel, each at a low baud rate so that the time taken to transmit the frame is long (typically, for example, on the order of a fraction of a second) relative to the expected duration of a fade. The effect of a fade is then spread out over many bits. Rather than a few adjacent bits being completely destroyed by a fade, all of the bits in the frame are slightly affected by a fade which occurs during the time that the frame is being transmitted.

A good scheme for transmitting a block of bits in parallel over a channel is orthogonal frequency division multiplexing (OFDM). OFDM may be used in many different types of data channel. The data channel may comprise, for example, acoustic signals being propagated through water, analog signals being transmitted through a wire such as a telephone line, AM, FM, or Single Side Band (SSB) radio signals. OFDM/FM is particularly attractive because it can be implemented by retrofitting existing FM communication systems.

In OFDM a block of bits is transmitted in parallel through a channel comprising a number of sub-carrier frequencies. The sub-carrier frequencies are chosen to be spaced in frequency from each other by a multiple of the symbol rate. That is, if the OFDM symbol duration is T seconds, the sub-carrier frequency spacing is 1/T Hz. With this frequency spacing, the sub-carriers are orthogonal over one symbol interval.

Data to be transmitted are grouped into blocks of K bits. Each block of K bits is encoded, as is further described below, and transmitted as a single data frame. The block of K bits is generally divided into smaller groups, each smaller group usually containing between 2 and 5 bits. Each smaller group is assigned to one sub-carrier frequency. The phase and magnitude of the sub-carrier at that frequency are then set to values determined by the data represented by the small group of bits. The encoding scheme is chosen to provide at least $2^m$ discrete signal points differentiated from each other in phase and/or magnitude where m is the number of bits assigned to the sub-carrier. For example, each of the $2^m$ possible combinations of the m bits assigned to a sub-carrier frequency may be assigned to one of the $2^m$ signal points in a $2^m$-QAM (Quadrature Amplitude Modulation) constellation. The number of bits m assigned to each sub-carrier can vary from one sub-carrier to the next. Of course, other encoding schemes besides QAM are also possible.

The transmitted signal is received by a receiver. For each sub-carrier, the transmitted information is extracted by measuring the phase and amplitude of each data-carrying sub-carrier and determining which point in the $2^m$-QAM constellation is closest to the signal point corresponding to the received sub-carrier. This signal point then identifies the m-bit data sequence transmitted on that sub-carrier. The original K bit block of data can then be reconstructed by combining the bits of data recovered from each sub-carrier.

Because information is encoded in the phase of the transmitted signal it is necessary to provide a means for synchronizing the received signal with the transmitted signal. Furthermore, particularly in a pure ALOHA environment, it is necessary to synchronize each OFDM frame independently. In a pure ALOHA environment the receiver does not know when a data frame will be transmitted. A data frame may be transmitted at any random time. Therefore, in a pure ALOHA environment the receiver cannot rely on information provided in previously received or subsequently received data frames for obtaining synchronization information for recovering data from a received data frame. Each data frame must carry its own synchronization information. Because of this limitation, it is difficult using prior art techniques known to the inventors to provide efficient OFDM communications channel in a pure ALOHA environment. As the available spectrum is limited, any synchronization scheme should have a low bandwidth overhead.

Synchronization schemes devised for parallel (OFDM) transmission over telephone channels have been disclosed in Hirosaki, A 19.2 kbps voiceband data modem based on orthogonally multiplexed QAM techniques, IEEE International Conference on Communications, 1985, Chicago Ill.; Keasler, Reliable data communication over the voice bandwidth telephone channel using orthogonal frequency division multiplexing, Ph. D. Thesis, University of Illinois at Urbana-Champaign, 1982 and Baran, U.S. Pat. No. 4,438,511. However, these schemes rely on several consecutive frames to maintain correct timing and do not meet the requirement that synchronization is achieved for each frame individually.

Moose, Differential modulation and demodulation of multi-frequency digital communications signals MILCOM 90, pp. 273–277, October 1990 discloses a synchronization technique for use in mobile satellite communications. In this technique, a synchronization frame is used to provide synchronization for a group of following data frames.

The performance of a synchronization technique can be measured by observing the frequency of false alarms, mis-detections and bad synchronizations. A false alarm occurs if the synchronization algorithm indicates the presence of a data block when none is present. A mis-detection occurs if the synchronization algorithm does not detect the presence of a data block when one is present. A bad synchronization occurs if the synchronization algorithm detects the presence of a data block when one is present, but does not correctly synchronize. Bad synchronization occurs when the signal is distorted enough to prevent proper synchronization, but not so distorted as to cause a mis-detection. A correct synchronization occurs if the synchronization algorithm detects the presence of a data block when one is present and correctly synchronizes to the data block.

Preferably a synchronization system should perform sufficiently well that inaccuracy in the synchronization procedure is not the major factor limiting the achievable bit-error-rate (BER). That is, the BER of the communication channel should be limited by the OFDM modulation technique rather than by the synchronization procedure. For example, in designing the synchronization scheme, the target probability of false alarm, mis-detection or bad synchronization may be set equal to the BER of the OFDM/FM system given ideal synchronization. This ensures that the BER with the synchronization procedure does not exceed twice the BER given ideal synchronization.

SUMMARY OF THE INVENTION

The invention provides a method for communicating from a transmitter to a receiver digital data comprising a series of data elements. The method comprises the steps of:
  a. providing a plurality of orthogonal frequency sub-carriers;
  b. reserving a first group of the frequency sub-carriers for synchronization tones having predetermined phases and amplitudes;
  c. encoding the data in the phases of a second group of the frequency sub-carriers;
  d. simultaneously broadcasting the first and second groups of frequency sub-carriers for a predetermined time period;
  e. receiving the frequency sub-carriers at the receiver;
  f. measuring the phases of the first group of the frequency sub-carriers;
  g. calculating a time shift from the measured phases of the first group of frequency sub-carriers;
  h. applying the time-shift to the second group of frequency sub-carriers; and
  i. decoding the data.

The invention also provides a method for recovering data from a transmitted OFDM signal, the signal comprising a plurality of data sub-carriers, a plurality of synchronization sub-carriers, and phase-encoded digital data associated with the data carrying sub-carriers. The method comprises the steps of:
  a. monitoring to detect the start of the signal;
  b. when the signal start is detected, taking samples of the signal at a frequency of at least twice the frequency of any of the sub-carriers for a fixed time period;
  c. storing the samples in a data buffer;
  d. taking groups of N consecutive ones of the samples and, for each of the groups, calculating the correlation between the group and a reference signal;
  e. detecting a one of the groups for which the correlation is greatest;
  f. deriving the phase and amplitude of each of the data-carrying sub-carriers in the signal by calculating the fast fourier transform of the one of the groups;
  g. adding a phase angle $\omega_i \tau^*$ to each of the data-carrying sub-carriers where $\omega_i$ is the frequency of the sub-carrier, and $\tau^*$ is a time-shift to maximize the correlation of the synchronization sub-carriers with the reference signal; and
  h. decoding the data from the phases and amplitudes of the data-carrying sub-carriers.

Another aspect of the invention provides a receiver for recovering data from a transmitted OFDM signal, the signal comprising a plurality of data sub-carriers, a plurality of synchronization sub-carriers, and phase-encoded digital data associated with the data carrying sub-carriers, the receiver comprising:
  a. a radio frequency receiver having an audio frequency output;
  b. threshold detection means for detecting when a radio signal is being received by the receiver;
  c. analog to digital conversion means for taking digital samples of the audio frequency output at a sampling frequency;
  d. data buffer means for storing the digital samples;
  e. correlation detection means for providing an output representative of the correlation between groups of N sequential ones of the stored digital samples and a reference signal;
  f. peak detection means for monitoring the output of the correlation detector means and detecting a peak in the output;
  g. data index calculating means associated with the correlation detection means and the peak detection means for providing a pointer to the start of a selected one of the groups of N sequential stored digital samples corresponding to the peak;
  h. calculation means for:
    i. calculating estimated phases and amplitudes of the data-carrying sub-carriers by calculating the fourier transform of a group of the stored digital samples identified by the pointer;
    ii. calculating a time-shift to maximize the correlation between the reference signal and the group of stored digital samples from the estimated phases;
    iii. calculating corrected phases of the data-carrying sub-carriers by calculating and adding to the estimated phases phase-shifts resulting from the time-shift;

i. decoding means for recovering the phase-encoded digital data from the corrected phases; and j. a data output.

BRIEF DESCRIPTION OF THE DRAWINGS

Preferred embodiments of the invention will now be described with reference to the following drawings in which.

DETAILED DESCRIPTION OF THE PREFERRED EMBODIMENT

1. Generating and decoding an OFDM/FM signal

Apparatus and methods for generating and decoding an OFDM signal are discussed in Keasler, Reliable data communication over the voice bandwidth telephone channel using orthogonal frequency division multiplexing, Ph.D. Thesis, University of Illinois at Urbana-Champaign, 1982, Cimini Jr. Analysis and simulation of a digital mobile channel using orthogonal frequency division multiplexing, IEEE Transactions on Communications, No. 7, July, 1985, p 665, Weinstein and Ebert, Data transmission by frequency-division multiplexing using the discrete fourier transform, IEEE Transactions on Communications Technology, vol. COM-19, page 628, October, 1971 and Casas and Leung, OFDM for Data Communication over Mobile Radio FM Channels, Part I: Analysis and Experimental Results, IEEE Transactions on Communications, vol. 39, page 783, May, 1991 which are incorporated herein by reference.

Figure 1:
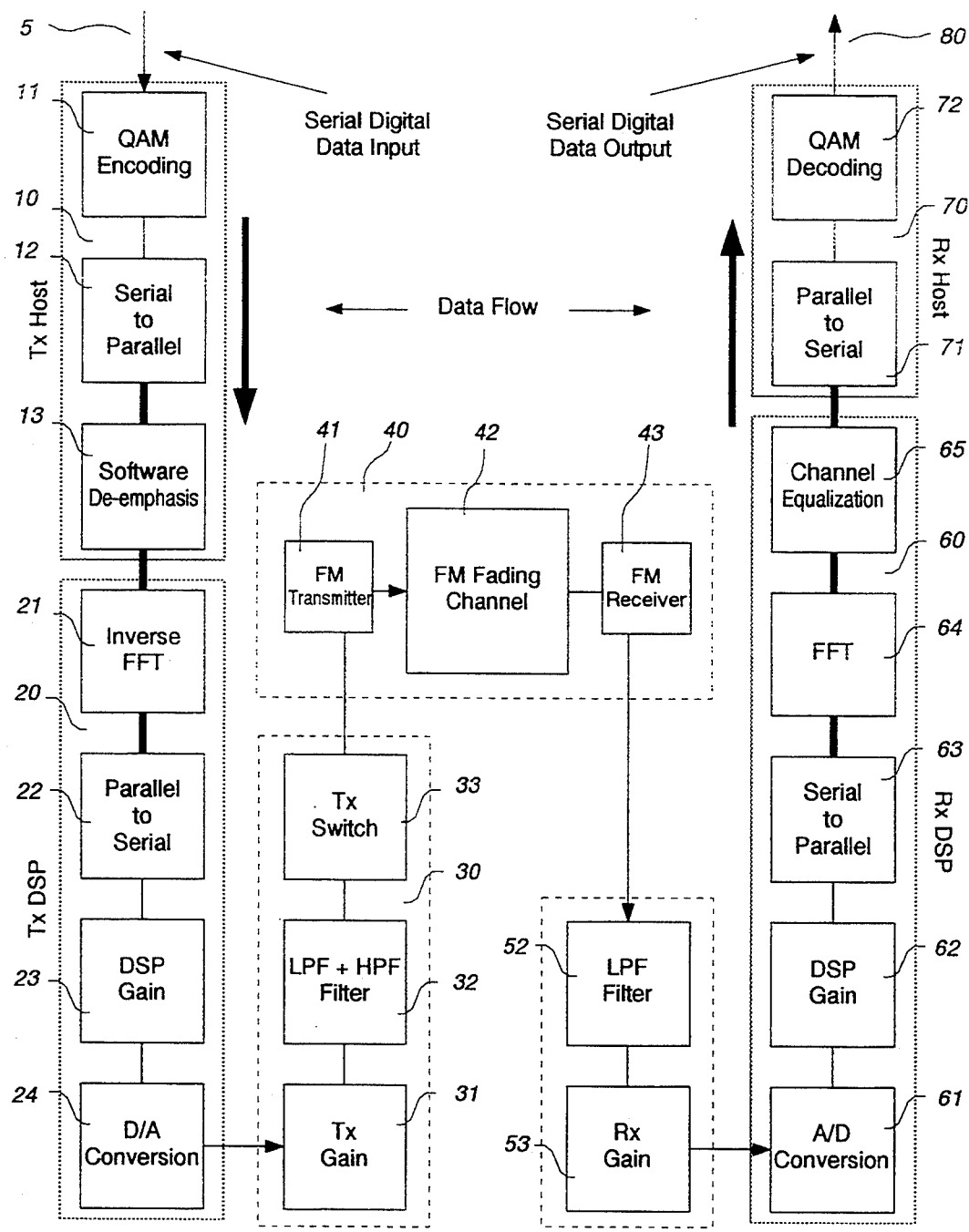
FIG. 1 is a block diagram of an OFDM/FM channel.

FIG. 1 is a block diagram which illustrates how data flows through an OFDM/FM data communication channel according to the invention. The digital FM channel comprises in sequence a source of serial data 5, transmitter host computer 10, a transmitter digital signal processor 20, transmitter signal conditioning apparatus 30, a radio channel 40 which is subject to fading, receiver signal conditioning apparatus 50, a receiver digital signal processor 60, a receiver host computer 70, and a serial digital data output 80.

Serial data 5 are first processed in transmitter host computer 10 and transmitter data signal processor 20 to generate a digital signal defining the OFDM baseband modulating signal. The transmitter and receiver host computers 10, 70 may be, for example, IBM PC/AT compatible computers. The digital signal processors 20, 60 may be for example model DSP56001 Processor Boards available from Spectrum Signal Processing Inc. of Burnaby, British Columbia, Canada, residing on the internal buses of the host computers. Digital to analog (D/A) and analog to digital (A/D) conversions may be achieved by means of cards such as Spectrum 4-channel Analog I/O boards connected to the digital signal processors and mounted on the internal buses of host computers 10, 70.

In transmitter host computer 10 serial data 5 are first encoded. In the encoding step 11 the stream of data is broken up into groups of m bits. Each group of m bits is encoded as phase and amplitude information for one of a number of sub-carrier frequencies. For example, if QAM encoding is used, the m-bit groupings of data are first encoded as complex values, a+jb, defining points in a $2^m$-QAM constellation. There may be, for example, 256 frequency sub-channels between 1 kHz and 3 kHz used to carry data and synchronization information. The output of encoding step 11 is therefore a stream of complex values which represent the phase and amplitude of the data-carrying sub-carriers in the signal to be transmitted.

In general, modulation and demodulation can be efficiently done using Inverse Fast Fourier Transform (IFFT) and Fast Fourier Transform (FFT) algorithms respectively. For example, the modulating signal may be obtained as follows. The IFFT algorithm operates on a block of data. Therefore, the complex numbers output from encoding step 11 are grouped. This is indicated by serial to parallel conversion step 12.

Before the IFFT is performed a software pre-emphasis is preferably carried out to adjust the amplitude of complex numbers in the block of data. The amount of the adjustment is proportional to the frequency of sub-carrier to which the data element is assigned. Preferably the adjustment is −10 dB per decade. This is discussed further below with reference to FIGS. 4 and 5.

The block of complex values is then input to an N-point Inverse Fast Fourier Transform (IFFT) algorithm, their location in the IFFT data array corresponding to the frequency of their assigned sub-carrier channel. Where a sub-carrier is not used, the corresponding value in the IFFT data array is set to zero. Only the lower half of the data array is independently specified. Each value in the upper half of the data array is set equal to the complex conjugate of the corresponding value in the lower half so as to produce a set of N real modulating signal samples when the IFFT is performed.

For example, an IFFT of block size N=1024 may be used to construct an OFDM signal from the QAM encoded data. Within this block, data elements from 0 to 127 and from 384 to 511 are set to zero. The QAM encoded data is transferred to data elements 128 to 383. Data elements 512 to 1023 are defined to be the complex conjugates of elements 0 to 511. Given a sampling rate of 8 KHz, if there are 256 frequency sub-channels between 1 kHz and 3 kHz then data element 128 in the constructed data block will correspond to the 1 kHz frequency sub-channel of the OFDM signal. Data element 384 will correspond to the 3 kHz frequency sub-channel.

The IFFT is conveniently carried out by transmitter DSP 20 and is indicated by step 21. The output of the IFFT is a block of data which represents the time-domain signal which will be used to modulate FM transmitter 41. The resulting block of digital data is converted to serial form in step 22.

Prior to D/A conversion, the amplitude of the signal is preferably modified by applying a software gain to the OFDM signal to optimize the loading factor (LF) which is defined as follows:

$$LF = \frac{\text{Peak Amplitude}}{\text{RMS Amplitude}} \qquad (1)$$

A D/A loading factor of approximately 3 to 4 tends to yield good results. This adjustment to the amplitude of the signal is carried out in step 23 prior to conversion of the data to analog form in step 24.

The resulting digital OFDM signal is passed through a D/A converter in step 24 and appropriate analog gain units 31 and reconstruction filters 32 to yield an analog OFDM signal which modulates the FM transmitter 41.

The reconstruction filter in step 32 may be, for example, an $8^{th}$-order Butterworth low pass filter with a cutoff frequency of 4 kHz. As a precaution, a high pass filter, for example an $8^{th}$-order filter with a cutoff frequency of, for example, 100 Hz may be used to remove any unexpected DC component from the signal.

Figure 2:
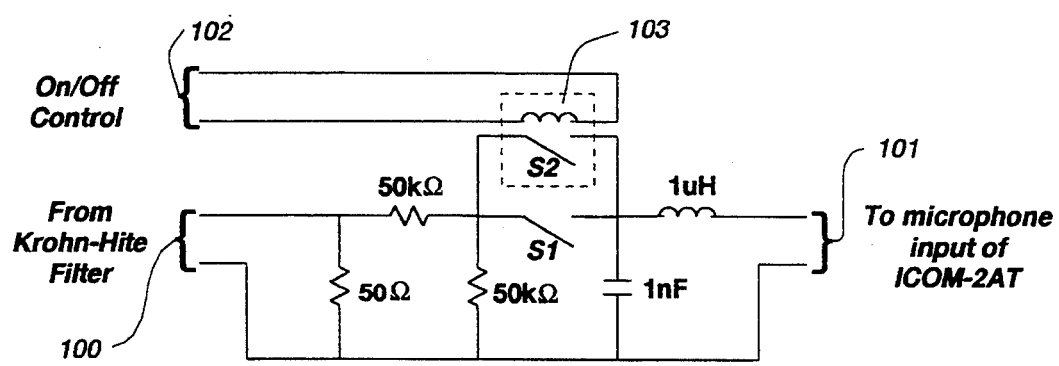
FIG. 2 is a schematic diagram of a switch for energising a radio transmitter in a communications channel according to the invention.

As discussed below, the system preferably includes means to energize radio transmitter 41 before the data frame is ready to be sent. For example, where transmitter 41 is an ICOM-2AT transceiver the transmitter should be turned on approximately 80 milliseconds before data transmission. The transmit switch circuit, shown in FIG. 2, may be used to enable the DSP hardware to turn a transmitter such as the ICOM-2AT transmitter on or off at the appropriate times. As shown in FIG. 2, the analog signal to be transmitted passes into input 100, through the illustrated circuit and into the radio transmitter through output 101. On/off control 102 controls relay 103. When relay 103 is turned on the signal can flow through relay 103 to output 101. Turning relay 103 on also energises radio transmitter 41. Within the ICOM-2AT transceiver, a load detector is attached to the microphone input. When a load is detected (i.e. when relay 103 is on), the transmitter's Push To Talk (PTT) is enabled. When the load is removed, PTT is disabled.

Of course, there are many variations on this method for creating an OFDM signal. For example, the segmentation of processing tasks between host computers 10, 70 and DSP units 20, 60 is dictated by available technology. These tasks could be segmented differently or performed by a single integrated device using technology different from that described above. Furthermore, the sequence of some of the steps described above is arbitrary. For example, step 12 could be performed either before or after step 11 and step 23 could be performed either before or after step 22.

The signal received by receiver 43 is preferably passed through a low pass filter (step 52) to prevent aliasing. The filter in step 52 may be, for example, a $16^{th}$-order Butterworth low pass filter, with a cutoff frequency of, for example, 4 kHz suitable to remove all frequencies above the frequency of the highest sub-carrier. The filter may, of course, be incorporated in receiver 43.

At the receiver 43, the recovered baseband signal is sampled and converted to digital form by an A/D converter in step 61. The receiver gain should be set to achieve a signal level at the input to the A/D converter sufficient to achieve a loading factor on the order of 4 (step 53).

The frequency at which the received data is sampled in step 61 must be high enough that the phase and amplitude of all of the data-carrying sub-carriers can be determined. For example, if the maximum frequency of the sub-carriers is 4 kHz then the sampling frequency should be at least 8 kHz.

As discussed above, in preparing the signal to be transmitted, a software gain is preferably applied to the signal to modify the loading factor. At the receiver, a reciprocal gain is preferably applied to counteract this. Without this, processing of the data by a fixed-point DSP may result in saturation and, therefore, distortion of the received data.

The received data is then processed in receiver DSP 60 and receiver host computer 70 by generally reversing the steps performed in transmitter DSP 20 and transmitter host computer 10 to recover data 80. As shown in FIG. 1, the receiving apparatus includes means 72 for decoding the received data and outputting the decoded data 80 to a data output.

2. FM Channel Design considerations

Proper design of a synchronization scheme for OFDM/FM requires knowledge of the characteristics of the FM radio transmitter-receiver used. The design of an OFDM/FM communication link between two ICOM-2AT transceivers, operating at a frequency of 144.15 MHz, one operating as a transmitter and one operating as a receiver will be used as an example for the purposes of this disclosure.

An abrupt change in the modulating signal, such as encountered at the start of the signal, gives rise to transients in the transmitted RF signal. Likewise, when the receiver experiences abrupt changes in the modulation of the received carrier signal, transients are generated. These transients result in a distorted received signal which degrades the orthogonality of the sub-carriers in the OFDM baseband signal. Therefore, it is important to allow the transients to decay before demodulation is performed. This may be ensured by preceding the OFDM modulating signal with a periodic extension of the signal itself as described by Cimini Jr. To reduce the likelihood of transients which could affect the reception of subsequent data frames it is also preferable to follow the transmitted data frame with a post-extension which gradually reduces in amplitude as it is turned off. To further reduce transient effects the pre-extension may be gradually turned on. For example, the first few milliseconds of the pre-extension and the last few milliseconds of the post-extension may be weighted by a raised cosine function. This provides a smooth transition in signal power from zero to full power during transmission of the pre-extension and from full to zero power during transmission of the post-extension. The purpose of the post-extension is to reduce the effect of transients on an immediately following OFDM signal block.

The transient response of the ICOM-2AT transceiver pair is such that a pre-extension duration of 4 milliseconds is adequate. This corresponds to 32 samples at a 8 kHz sampling rate. For an OFDM block size of 1024 samples, this represents an overhead of approximately 3% which is acceptably small.

Radio Attack Time is usually specified separately for the transmitter and receiver. It can be a major source of transmission overhead as modulation cannot start until the transmitter RF carrier has attained a certain power level and the receiver output power has stabilized. A longer radio attack time requires a larger "wait" time. This can severely limit efficiency, especially in systems with small packet lengths.

In this disclosure, the FM Channel Attack Time is the combined attack time for the Transmitter-Receiver system. The FM Channel Attack Time is defined as the time required for the receiver audio output power to reach its steady-state value after operation of the transmitter control switch. For the ICOM-2AT transmitter-receiver system, the FM Channel Attack Time is approximately 80 milliseconds.

Figure 3:
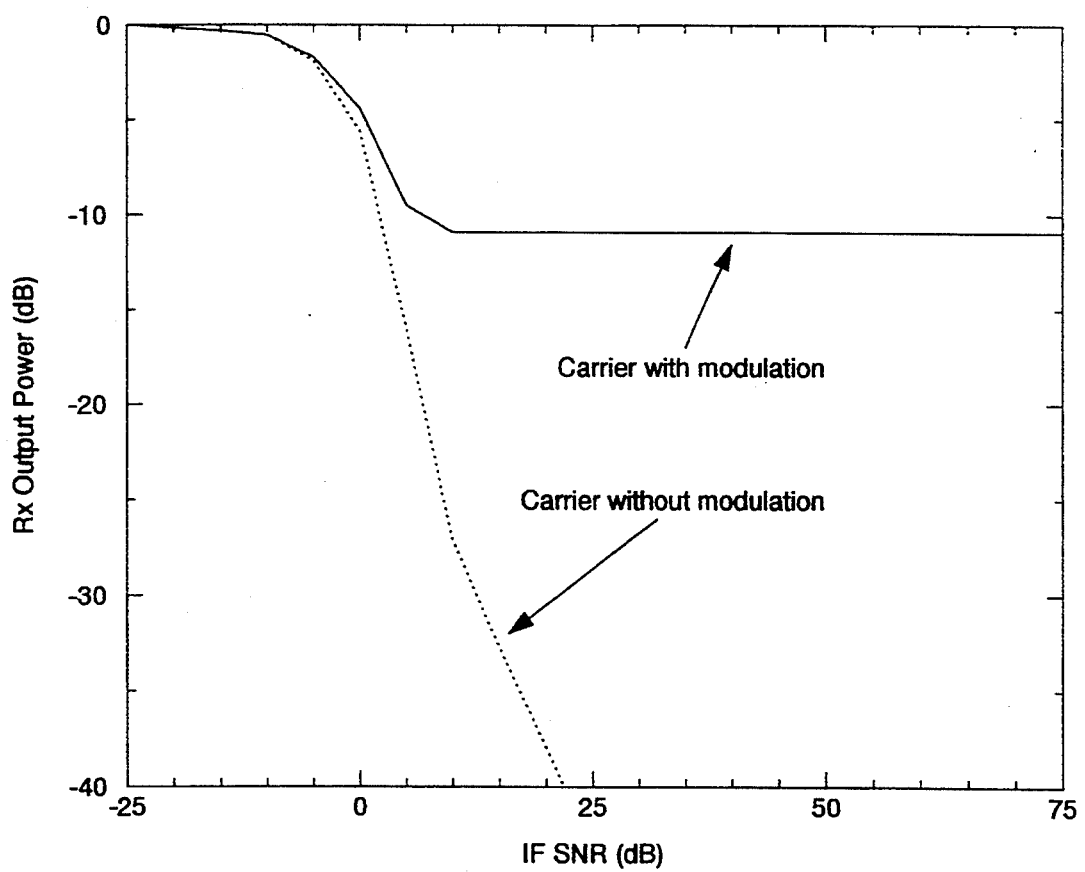
FIG. 3 is a graph of audio output power as a function of signal strength for a typical FM receiver.

When the receiver squelch is disabled, the audio output power of the ICOM-2AT receiver is greater in the absence than in the presence of a (modulated or un-modulated) carrier. Therefore, monitoring the audio output power level provides a means to detecting when an OFDM carrier is being transmitted. FIG. 3 is a plot of the audio output power of an ICOM-2AT receiver in the presence of OFDM modulated and un-modulated carriers at various IF SNR levels.

The expression for the noise power spectrum W(f) at the output of an FM discriminator is quite complicated. If f is less than about half the IF bandwidth, W(f) can be characterized as follows: At high IF SNR's, W(f) increases as f whereas at low IF SNR's, W(f) varies little with f. Because most FM transceivers including the ICOM-2AT transceiver are designed to operate in a high IF SNR environment, such transmitters generally incorporate a +20 dB per decade standard pre-emphasis filter; a corresponding −20 dB per decade de-emphasis filter is present in the receiver.

Figure 4A:
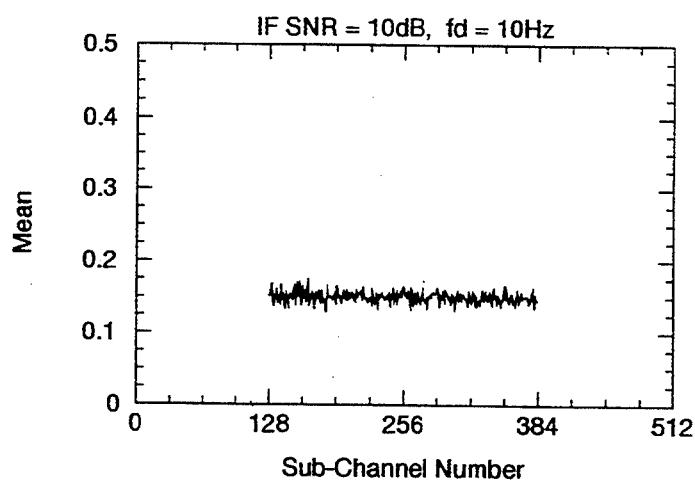
FIG. 4A and 4B are graphs of noise power distribution in transmitted and received signals respectively where the modulating signal has constant power across the spectrum.
Figure 4B:
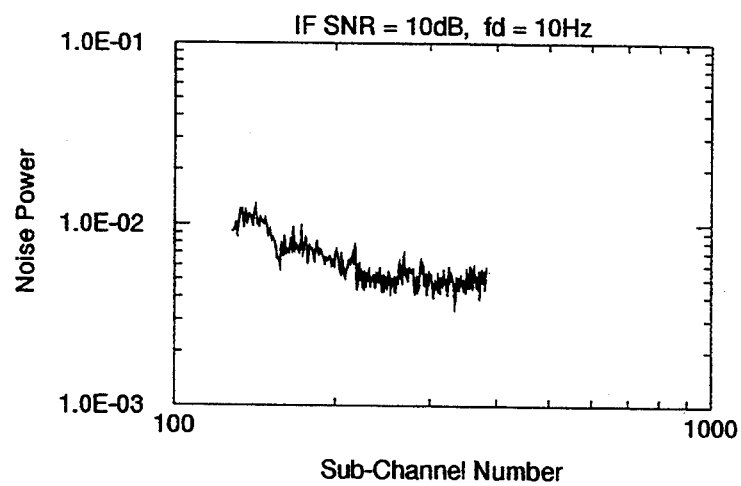
Figure 5A:
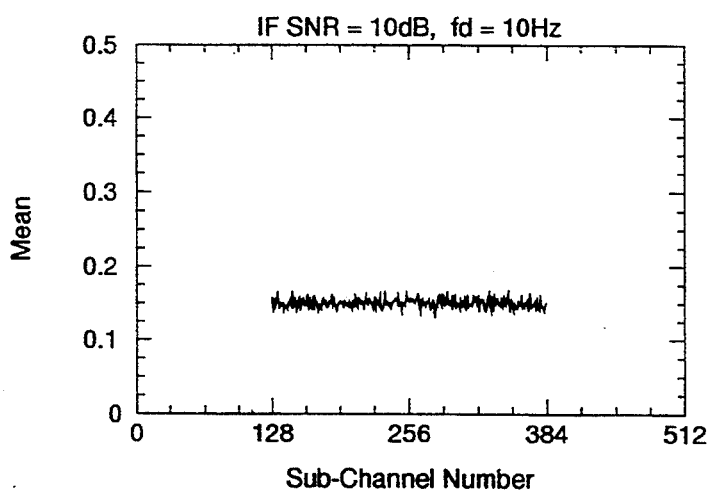
FIGS. 5A and 5B are graphs of noise power distribution in transmitted and received signals respectively where the modulating signal has a −10 dB per decade pre-emphasis.
Figure 5B:
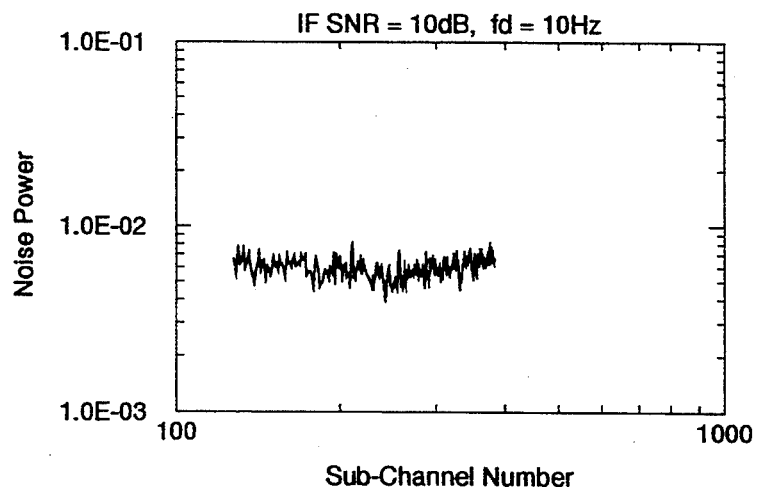

In a fading environment, the IF SNR fluctuates and there are times when it will be low. As a result, the baseband noise spectrum at the output of the receiver (after de-emphasis) may no longer be flat. For example, FIGS. 4A and 4B are plots of the signal mean and noise power spectrum of a received signal transmitted by an ICOM-2AT transmitter over a simulated fading FM channel at an IF SNR of 10 dB and a Doppler rate of 10 Hz. In the transmitted OFDM modulating signal power was distributed evenly across the spectrum. FIG. 4A and 4B show that the signal mean is constant over the band whereas the noise power tends to be smaller for the higher frequency sub-channels. As shown in FIGS. 5A and 5B, using a −10 dB per decade pre-emphasis as discussed above with respect to step 13 (in addition to the built-in +20 dB per decade standard pre-emphasis) tends to equalize the SNRs of the received signal sub-channels.

The attainable bit rate at a given error rate and SNR, may be maximized by adjusting the power distribution among the sub-channels to an optimum distribution which can be calculated by a "water-pouring" procedure as described in Gallager, *Information Theory and Reliable Communication*, John Wiley & Sons, New York, 1968 which is now well known. Alternatively, bit error rates (BERs) can be equalized over the sub-channels by employing a technique known as adaptive loading as described in Bingham, Multi-carrier modulation for data transmission: an idea whose time has come, IEEE Communications Magazine, May, 1990 p. 5 which is incorporated herein by reference. In adaptive loading more bits are assigned to the sub-channels with higher SNR and fewer bits are assigned to the sub-channels with lower SNR.

The hardware comprising the digital FM channel, specifically the analog components, introduce phase and amplitude distortions which must be accounted for when decoding the OFDM signal. To measure the compensation required, a training procedure is performed in which known blocks of pseudo-random data are transmitted to the receiver. The received data blocks are then compared to the transmitted data blocks to determine the corrections required to counteract the phase and magnitude distortions. The corrections are preferably implemented in software at the receiver.

Figure 6:
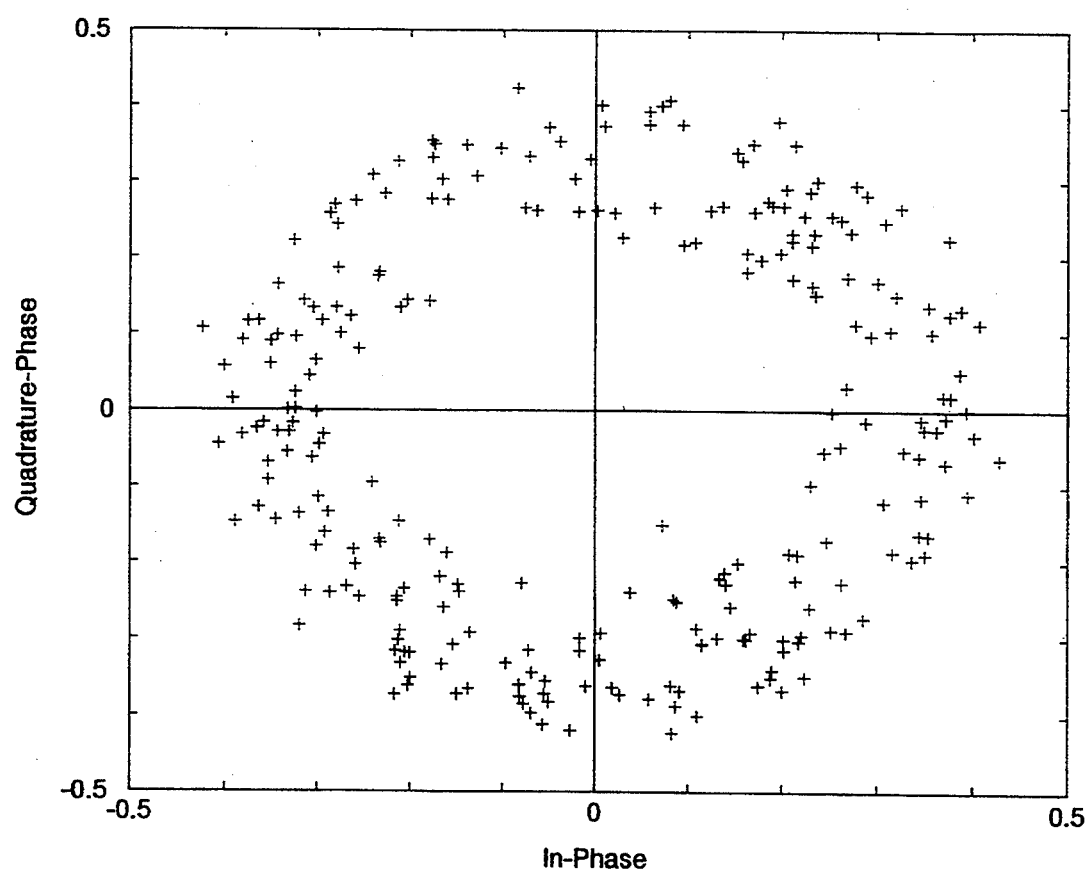
FIG. 6 is a scatter plot showing the calculated phase and amplitude of received data with no equalization.
Figure 7:
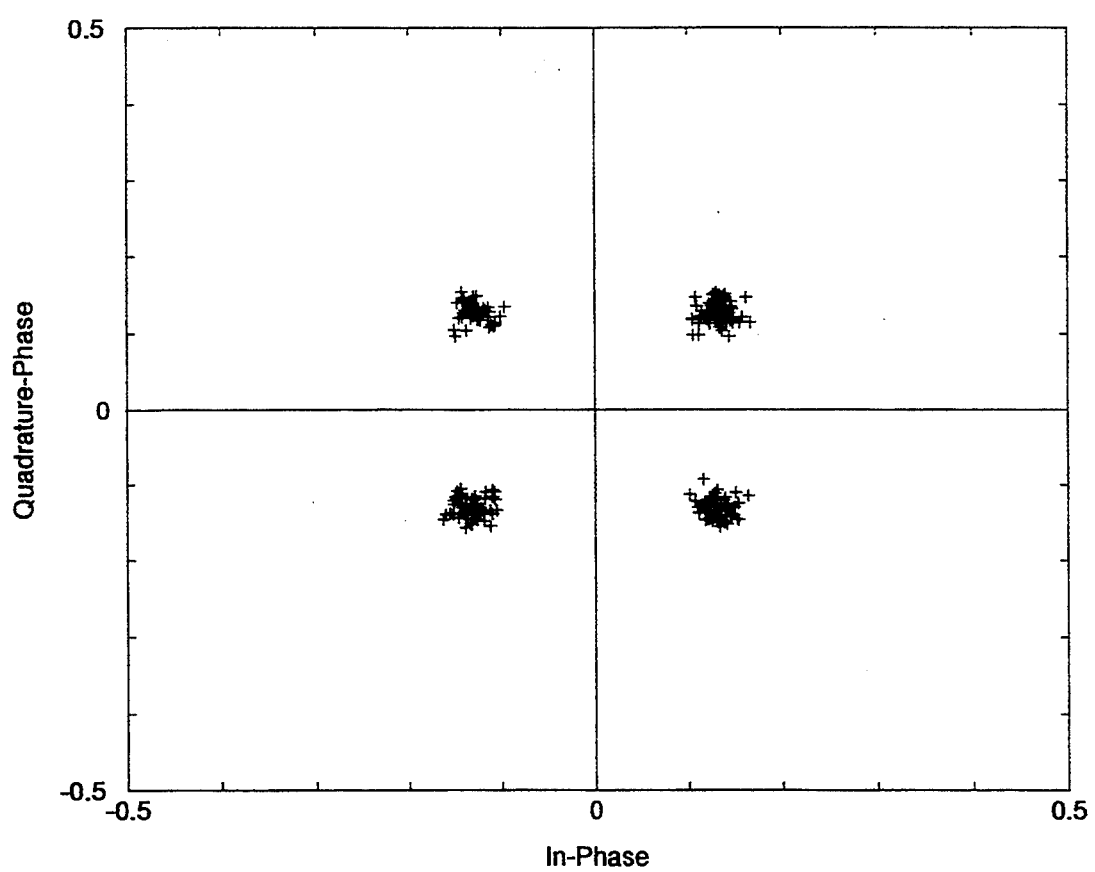
FIG. 7 is a scatter plot of the data of FIG. 6 after channel equalization.

The effect of channel equalization can be seen from a comparison of FIGS. 6 (no equalization at all) and 7 (with equalization). The data in FIG. 6 is distorted by phase and amplitude shifts caused by the analog components in the transmitter and receiver circuitry and a time-shift resulting from the loop-back used during the training procedure for measuring the distortions to be compensated for. Both Figures are scatter plots of 4-QAM encoded data extracted from a received OFDM signal with IF SNR=15 dB and no fading. With channel equalization and a time-shift, the received data points are clustered around the four QAM constellation points as shown in FIG. 7.

3. synchronization method and apparatus

The synchronization scheme of the invention encodes synchronization information in parallel with data in the same manner in which data is encoded in the OFDM/FM frame. The synchronization information is transmitted in the form of tones, centred in reserved frequency sub-channels of the OFDM signal. A correlation detector in the receiver, which is preferably implemented in the frequency domain, (but could be implemented in the time domain) is used to accurately acquire synchronization on a frame by frame basis.

In the synchronization method of the invention, the transmitter encodes a number, J, of reserved sub-channels with tones having known phases and amplitudes. The remaining sub-channels are encoded with data as outlined above. The technique does not rely on an accurate time domain detection of the start of the data block and is therefore relatively insensitive to channel fading. The performance of the technique depends on the number of synchronization sub-channels used. For a given number of synchronization sub-channels, performance can be improved through judicious selection of sub-channels.

The method of the invention preferably achieves synchronization by a process comprising three stages: phase I; phase II; and, phase III. In phase I, the received signal is sampled and the power in the received signal is compared to a threshold value to detect when an OFDM signal is present. Phase I does not attempt to acquire synchronization, but merely obtains a rough estimate of the location of the signal. When a signal is detected phase II is commenced. In Phase II, a correlation detector is used to extract the synchronization information from the received signal and to acquire synchronization to within ±½ of the sampling period. Phase III provides fine tuning by calculating and applying to the signal a time shift to accurately locate the local peak of the correlation function calculated in Phase II. Phases I, II and III may be implemented in receiver DSP unit 60.

The selection of the sub-channels of the OFDM signal to be reserved for synchronization is important to the performance of the synchronization algorithm. As with synchronization techniques for serial communications, the correlation functions for different synchronization signals have different side lobe patterns which affect synchronization performance.

Each sub-carrier of an OFDM signal has an integer number of periods in a frame duration. Since the synchronization signal is the sum of phase encoded sub-carriers, it will also have this property. We will refer to the period of the synchronization signal as the synchronization period. The exact number of synchronization periods in a frame duration depends on the specific sub-carriers used for synchronization.

In Phase II, the output of a correlation detector is monitored for a fixed period of time to locate the point at which the output of the correlation detector peaks. If the correlation detector is monitored for a period of time greater than the synchronization period, two correlation peaks may be detected, causing synchronization errors. Therefore, the synchronization signal should have a period greater than the duration of Phase II. Ideally, the J sub-carriers should be the particular sub-carriers which combine to provide a synchronization signal having a synchronization period greater than the minimum required and for which the correlation function has the minimum correlation side-lobe levels. The number, J, of sub-channels needed for adequate performance may be determined experimentally. Typically J is in the range of 6 to 25.

Figure 8:
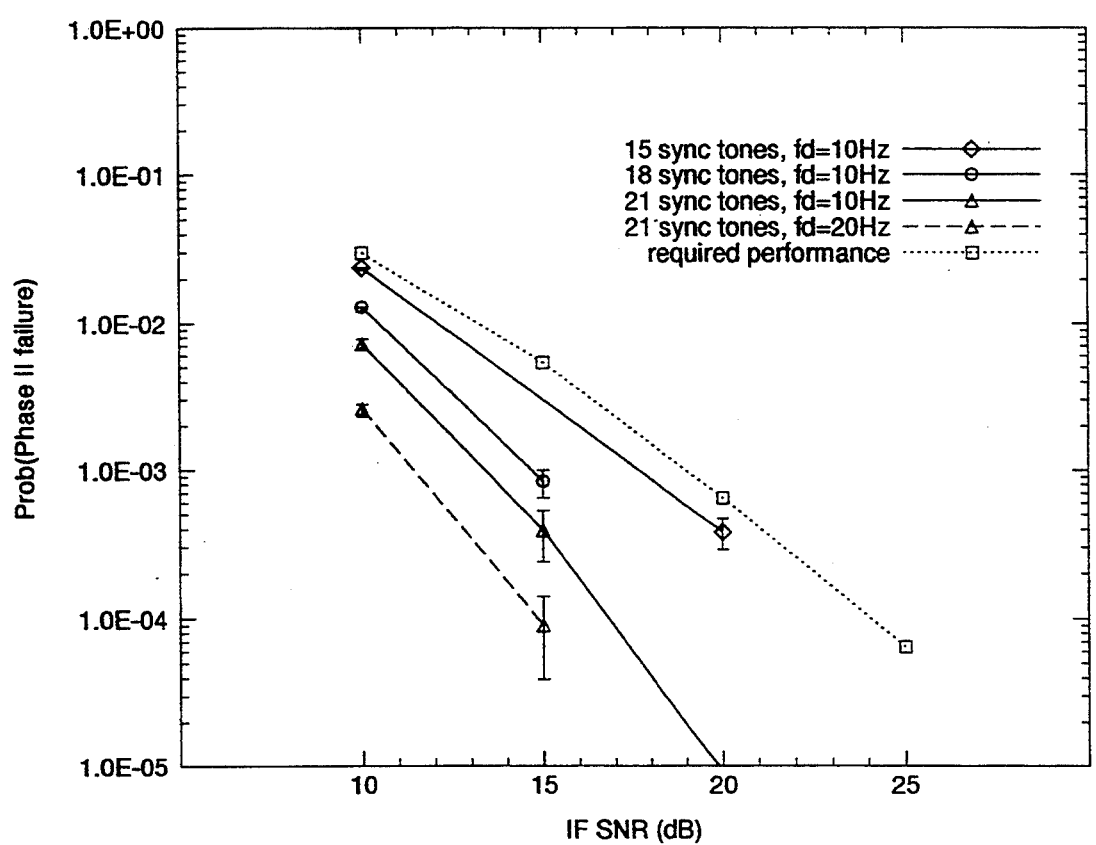
FIG. 8 is a plot showing the probability of failure to achieve coarse synchronization as a function of the IF SNR level for different numbers of synchronization tones.

The required number J of synchronization tones can be determined by experimentally measuring the probability that Phase II fails to achieve synchronization to within ±½ of a sample period and increasing the number of synchronization tones until the communications link performs adequately. For example, FIG. 8 shows the probability of phase II failure as a function of the IF SNR level for different numbers of the synchronization tones set out in Table 1 and different Doppler rates. For the example given in FIG. 8 and Table 1, OFDM block size is 1024, therefore available sub-channels are [0, 512]. Of these, only [128, 384] are used.

In FIG. 8, three curves appear for the Doppler setting of 10 Hz, corresponding to the use of 15, 18, and 21 synchronization tones. The sub-channels used for synchronization are listed in Table 1 and were selected as is discussed below. The list of selected sub-channels in Table 1 is cumulative. For example, the sub-channels selected for 6 synchronization tones are sub-channels 162, 246, 312, 170, 310, and 358. Comparing these curves with the reference curve indicating the desired performance (also shown in FIG. 8), it is apparent that the desired performance can be achieved using 15 synchronization tones. FIG. 8 also shows a performance plot for 21 synchronization tones at a Doppler rate of 20 Hz. The effect of increasing the Doppler rate from 10 Hz to 20 Hz results in a 2 dB improvement.

TABLE 1

| Number of Sync. tones | Selected sub channels (cumulative) | | |
|---|---|---|---|
| 3 | 162 | 246 | 312 |
| 6 | 170 | 310 | 358 |
| 9 | 176 | 214 | 256 |
| 12 | 206 | 230 | 370 |
| 15 | 132 | 190 | 224 |
| 18 | 140 | 234 | 372 |
| 21 | 184 | 276 | 344 |

Given a number J, a brute force method to determine the best J sub-channels to use for synchronization purposes is to calculate the correlation function for all possible combinations of J sub-channels and to determine which combination results in a correlation function with a synchronization period greater than the duration of phase II and the smallest side-lobes (i.e. with the best defined peak). To facilitate the computation of the correlation function of the transmitted synchronization signal and the reference signal, two assumptions may be made: (1) the channel does not distort significantly the transmitted signal; and (2) The pre-extension and post-extension of the transmitted signal are each of duration at least N/2, where N is the duration of a single data frame. A computer search based on this simplified model may be run to determine the best J sub-channels to use. Such computer searches are extremely computation intensive. For example, a brute force search to select 4 from 256 available sub-channels on a SUN SPARC Station 1 takes approximately 7 days to complete. Selecting 5 from 256 available sub-channels would likely take nearly a year to complete.

To reduce the search time, two further simplifications may be made. First, the search can be limited to sub-carriers having an integer number of periods in the minimum required periodic duration. Results from experiments involving selecting a group of four optimal synchronization sub-channels having different synchronization periods show that each of the 4 sub-carriers selected had an integer (or close to an integer) number of periods in the minimum required periodic duration. Secondly, the search may be divided into a number of steps. At each step, the selected sub-channels from the previous step are kept and an additional 3 sub-channels are selected from the remaining sub-channels that provide the smallest side-lobes when used in combination with the sub-channels selected during the previous step.

Figure 9:
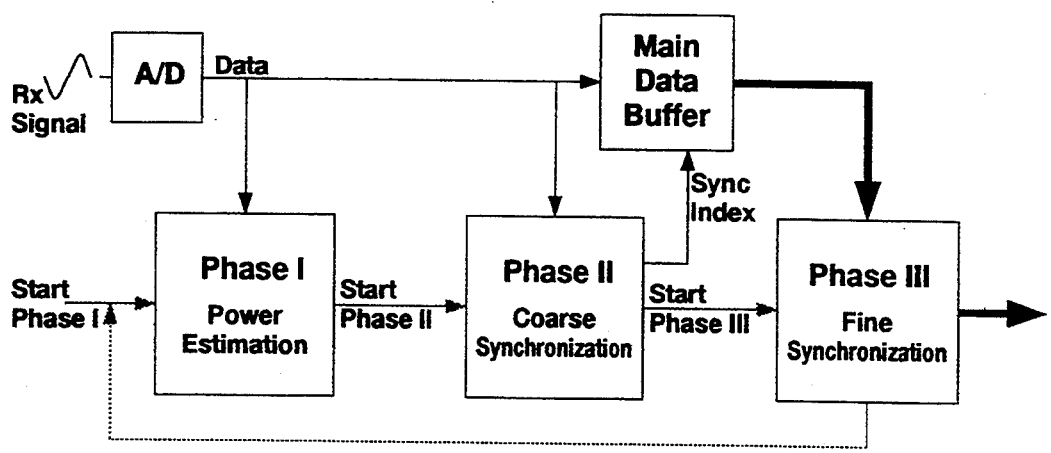
FIG. 9 is a block diagram showing the steps involved in synchronizing OFDM data flames according to the invention.

FIG. 9 is a block diagram of the steps used to achieve synchronization according to the invention. As shown in FIGS. 1 and 9, the received analog signal is sampled and converted to digital data at an appropriate sampling frequency which is typically on the order of 8 kHz (step 61). The resulting data is transferred to a main data buffer 110 which is accessible to the circuitry responsible for implementing phases I and II (step 63).

Phase I-Power Detection

FIG. 3 shows that the audio output power of the receiver is larger in the absence than in the presence of a (modulated or unmodulated) carrier. In an ALOHA mobile radio environment, a transmitter only generates a carrier when transmitting data. The receiver audio output power can therefore be used as an indicator of the presence or absence of a data frame.

As shown in FIG. 9, the audio output power level is continuously sampled and monitored during phase I. When the power level drops below a preset threshold, it is assumed that an OFDM signal is present and phase II is initiated.

Figure 10:
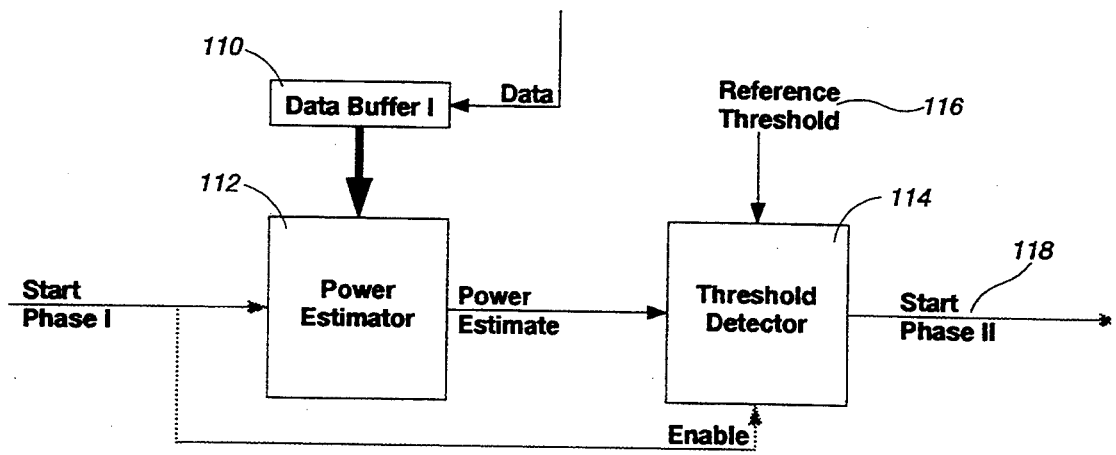
FIG. 10 is a block diagram showing the steps involved in detecting the presence of an OFDM data frame according to the invention.

FIG. 10 shows the operation of phase I in greater detail. During phase I, the received signal is periodically sampled and converted to digital form by an analog to digital (A/D) converter. The resulting digitized samples are stored in a data buffer 110. Each time a new data value is received from the A/D converter it is loaded into data buffer 110 and the oldest data value in data buffer 110 is discarded. Data from data buffer 110 is read and an estimate of the receiver output power is calculated from the data in buffer 110 (step 112). The estimate of the receiver output power level is obtained using:

$$p = \sum_{i=0}^{N_s-1} (x_i)^2 \quad (2)$$

where $x_i$ are the data samples in data buffer 110 and $N_s$ is the number of samples used in the estimate. Each time a new value for p is calculated, p is compared to a preset threshold value 116 (step 114). If p is less than threshold value 116 then a signal 118 is generated to trigger the start of phase II. Phase I continues for as long as p is greater than threshold value 116.

The choice of $N_s$ involves a trade-off between reliability and responsiveness to changes in the output power. Smaller values of $N_s$ provide a fast response to changes in output power and a higher probability of false alarms. With larger values of $N_s$ the variance of the power estimate is reduced but the response to changes in output power level is slower. As a compromise, $N_s$ may be set equal to N, the number of samples in an OFDM frame.

If the threshold is set too high, the result will be a high probability of false alarm. On the other hand, a threshold which is set too low will result in a high probability of missing OFDM data frames.

Figure 11:
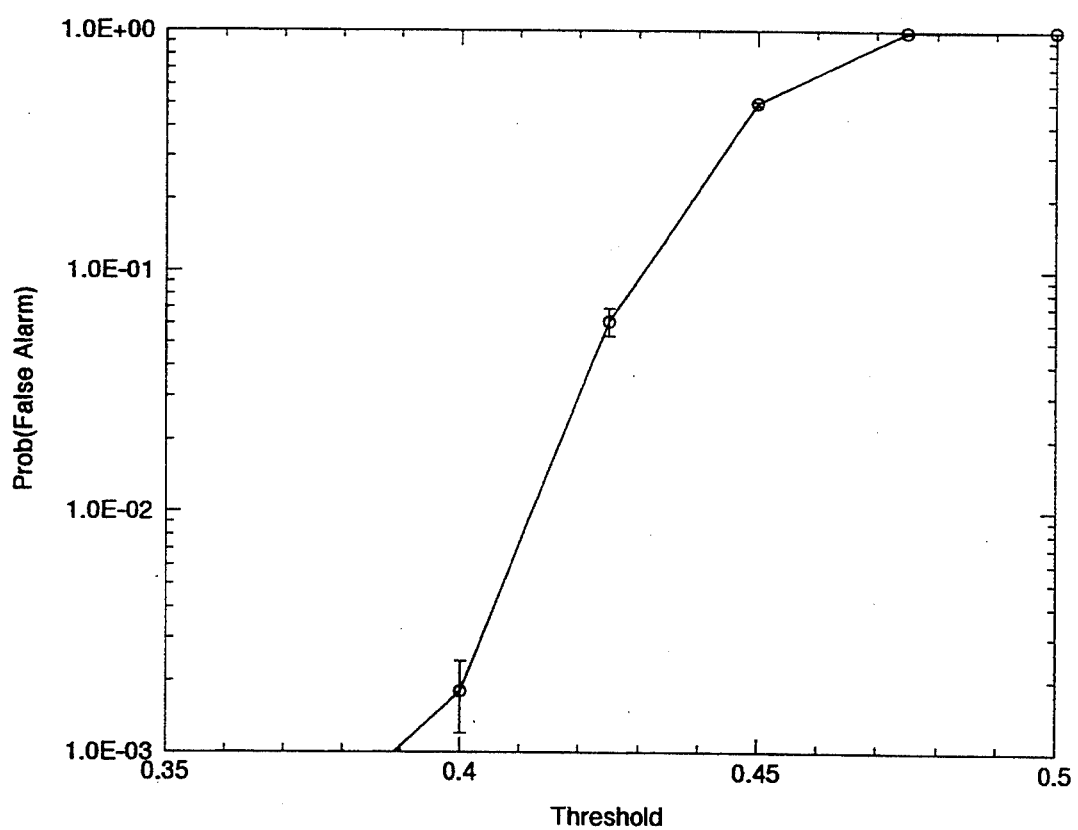
FIG. 11 is a plot of the probability of falsely detecting an OFDM data frame as a function of the threshold used to determine when a data frame is not present.

As shown in FIG. 11, the probability of a false alarm in the absence of a transmitted signal depends on the threshold. From this, the probability of false alarm for a range of threshold levels can be predicted. The data for FIG. 11 was obtained by making 50000 trials, each representing the transmission and reception of one OFDM data block, for each indicated threshold level. During each trial, no RF carrier is present. The power of the demodulated baseband signal received from the FM receiver is estimated using 1024 samples of the received signal. Power estimation continues each time a new sample is received and concludes when a total of 1024 additional samples have been received. A false alarm is detected if any of the 1025 power estimations has a value less than the specified threshold.

In a particular case, a suitable threshold value may be determined by selecting a threshold value below which no false alarms are detected during testing. For example, for thresholds of 0.375 and lower, no false alarm errors were detected during the collection of data for FIG. 11.

Different threshold levels may be selected for signals having different IF SNR levels. The threshold used for each IF SNR level is preferably determined experimentally. The goal is to reduce the probability of detection occurring after the point of synchronization to satisfy the specified probability of miss synchronization. At the same time, the probability of detection at a point well before synchronization is preferably reduced, since this will improve the conditions under which Phase II must operate.

Figure 12:
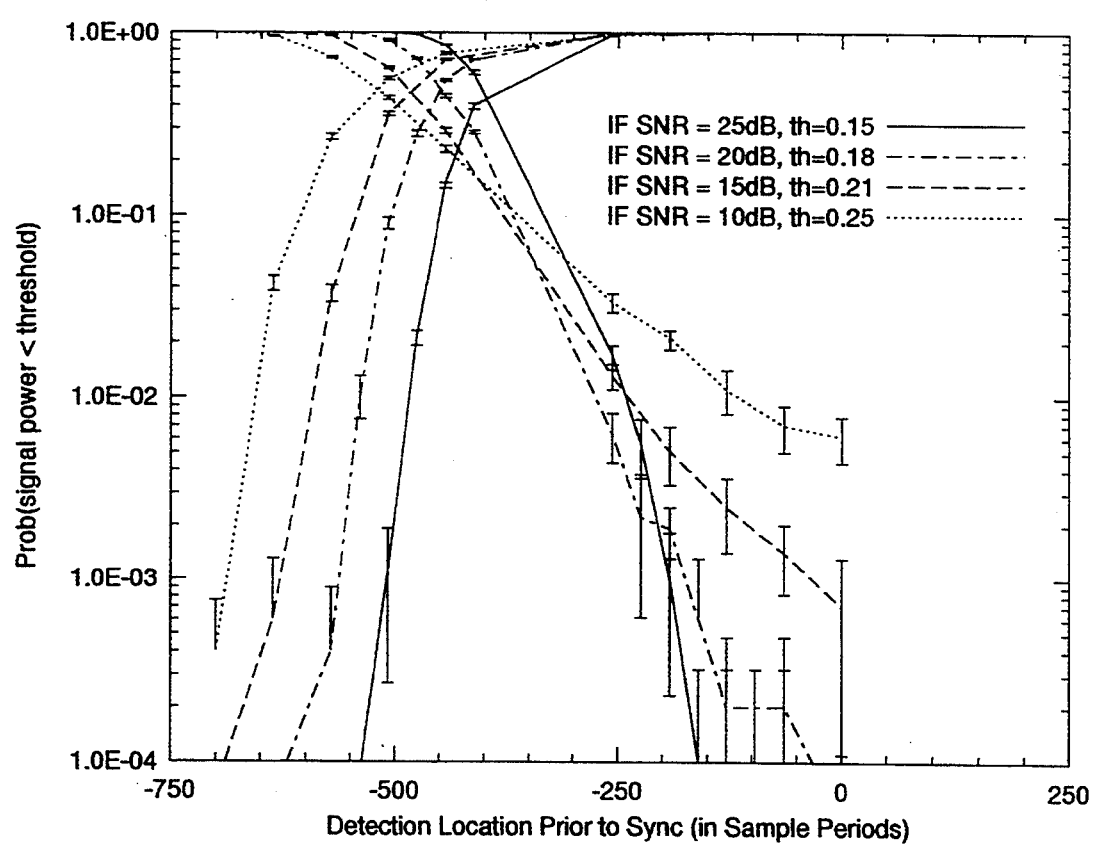
FIGS. 12 and 13 are plots which illustrate the performance of a test system for detecting the presence of an OFDM frame according to the invention.
Figure 13:
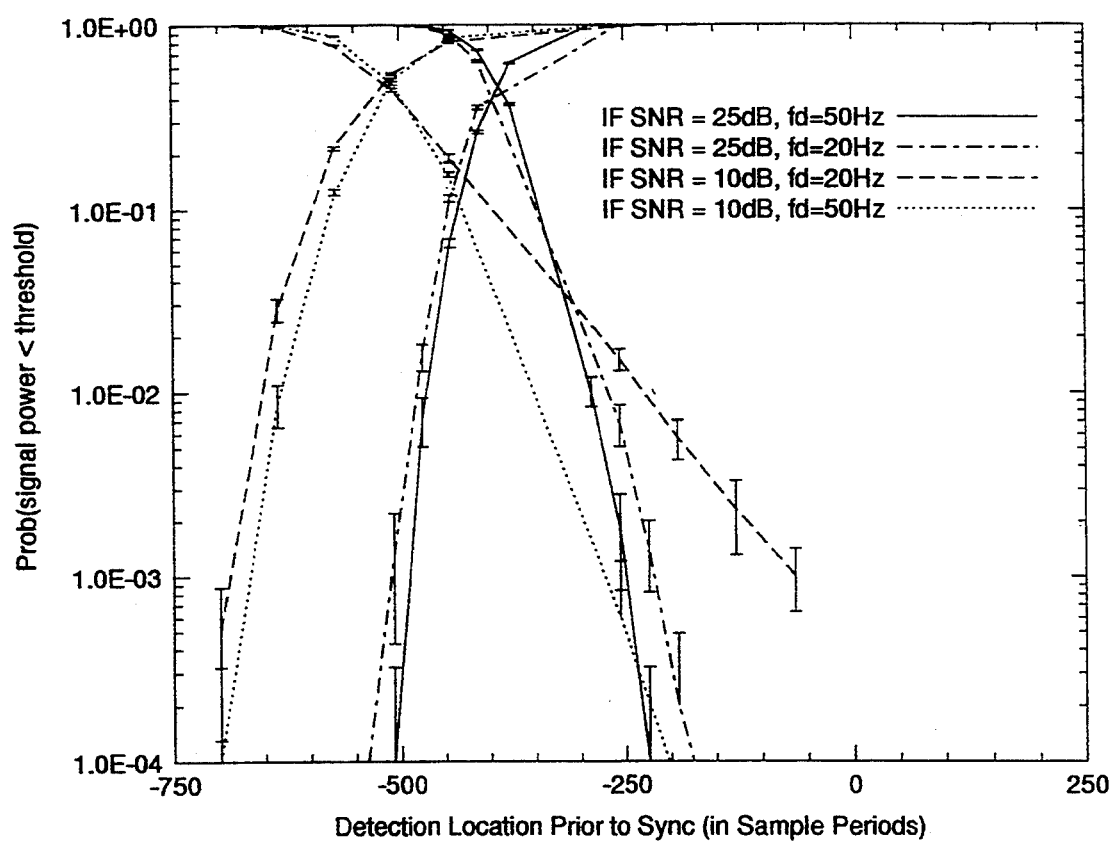

For example, FIGS. 12 and 13 show the performance of Phase I in the presence of a transmitted OFDM signal for a test system. The results indicate the accuracy with which Phase I determines the location of an OFDM data frame. Two sets of curves appear. The curves rising to the right give the probabilities that the estimated signal power drops below the threshold prior to that location. The horizontal axis indicates the location of detection prior to the start of the OFDM frame. The second set of curves (rising to the left) is generated by subtracting the first set from 1.0. They represent the probabilities that the estimated signal power does not drop below the threshold prior to that location. For the test system, thresholds of 0.15, 0.18, 0.21 and 0.25 were selected for IF SNR levels of 25 dB, 20 dB, 15 dB and 10 dB respectively. These thresholds are all below the level for which false alarms were detected.

Phase II-Coarse Synchronization

Phase II is used to acquire synchronization alignment to within $\pm\frac{1}{2}$ sample period. This is considered to be "coarse" synchronization because it is unacceptable for the decoding of the OFDM data. For example, at a sampling rate of 8 kHz, an alignment error of $\pm\frac{1}{2}$ of a sampling period will result in a phase error of $+45$ degrees in the data sub-carrier corresponding to 2 kHz, the centre of the OFDM baseband signal. This is unacceptable for QAM decoding. For higher frequency data sub-carriers, the phase errors will be even greater.

Figure 14:
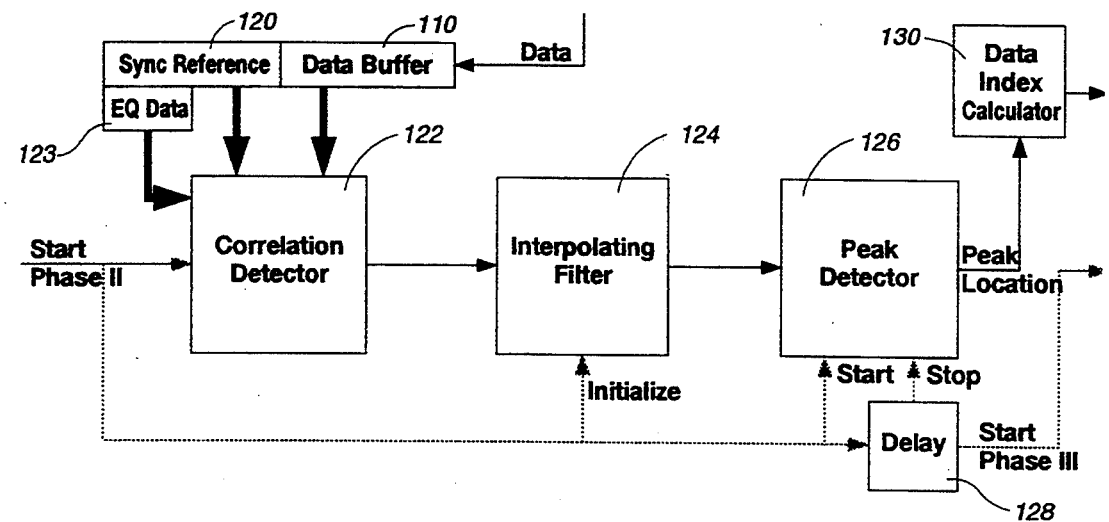
FIG. 14 is a block diagram illustrating the method of obtaining coarse synchronization of an OFDM data frame according to the invention.

As shown in FIG. 14, the received A/D samples are temporarily stored in data buffer 110. At the start of Phase II, data buffer 110 contains the same data that it contained at the end of Phase I. During Phase II, initially, and each time a new data value is received, the correlation of the data in data buffer 110 and a reference synchronization signal 120 is determined (step 122). During step 122 the received signal is equalized to correct the phase and amplitude distortions introduced in channel 40. The correlation between the received signal and reference signal 120 is preferably carried out in the frequency domain. In this case, reference signal 120 can be conveniently stored as a sequence of stored complex values representing the predetermined phases and amplitudes of each of the synchronization tones in the transmitted signal. Equalization information 123 may also be stored as a series of phase and amplitude corrections to be applied to the individual sub-carriers. For example, equalization information 123 may be a series of equalization phasors.

The output of correlation detecting step 122 is preferably input to an interpolating filter 124 to provide a higher rate of samples. During phase II, a peak detector 126 monitors the output of interpolating filter 124 (or the output of the correlation detector 122 if there is no interpolation filter) and records the location of the peak value. Peak detector 126 is reset and begins operation at the start of Phase II. Phase II is halted a fixed time after it begins by a control signal 129 from a timer 128 which is triggered at the start of phase II.

The results of the tests described above with reference to FIGS. 12 and 13 may be used to determine the required duration of Phase II. For a given IF SNR, the location at which the curve rising to the right equals the required synchronization performance is determined. The distance from this location to the point of synchronization indicates the necessary duration of Phase II. This process is repeated for each IF SNR level. The aim is to ensure that Phase II lasts long enough that the point of maximum correlation bet-ween the received signal and reference signal 120 will occur during phase II.

From the experimental results of FIG. 12 it can be seen that a duration of 700 sample periods is sufficient to meet the required synchronization performance for all IF SNR levels of interest. Of course, the required duration of phase II will differ from system to system. FIG. 13 shows the effect of increasing the Doppler rate. A higher Doppler rate reduces the necessary duration of Phase II.

The peak located during phase II corresponds approximately to the point of synchronization. A Data Index Calculator 130 converts the output of the peak detector to an index pointer that identifies the location, in the data buffer 110, of the synchronized data block. Control signal 129 halts operation of the peak detector and also triggers the start of Phase III.

To provide flexibility and adaptability at a modest computational load, the correlation detecting step 122 is preferably implemented in the frequency domain although the method of the invention could be practised with a time-domain correlation detector. To reduce the computational burden in transforming the data to the frequency domain, a Discrete Fourier Transform (DFT) update routine, is preferably used.

The DFT update routine achieves a reduction in computational complexity by updating the spectral estimates based on previous estimates and by only updating the spectral estimates for the specific frequencies required. It is very effective for the correlation detector which only requires the spectral information for the synchronization tones. The DFT update equation is $$X_{n+1}(k) = [X_n(k) - x(n) + x(n+N)] \exp^{j\frac{2k\pi}{N}} \quad (3)$$

where N is the block size of the DFT/FFT, x(n) is the $n^{th}$ data sample and $X_n(k)$ is the spectral information of the $k^{th}$ sub-channel with the data window positioned between the $n^{th}$ and the $(n+N)^{th}$ data samples.

When Phase II is initiated, a previous spectral estimate does not exist. Therefore, the synchronization tone spectral information of the received data is calculated using a DFT or FFT. Depending on the number of sub-channels of interest, the DFT may be faster than the FFT. Following this, the spectral estimates are updated using Equation (3). A drawback of the DFT update routine is that round-off errors accumulate at each invocation of the routine. Therefore, the DFT/FFT should be used periodically to recalculate the spectral estimates. The frequency of recalculation will depend upon the precision of the DSP used.

Using the DFT update routine, the data in data buffer 110 is processed to extract the phase and magnitude of the synchronization tone sub-channels. To compensate for channel phase and magnitude distortions caused by the digital FM channel hardware, the received synchronization tone phasors are multiplied by equalization phasors 123.

Figure 15:
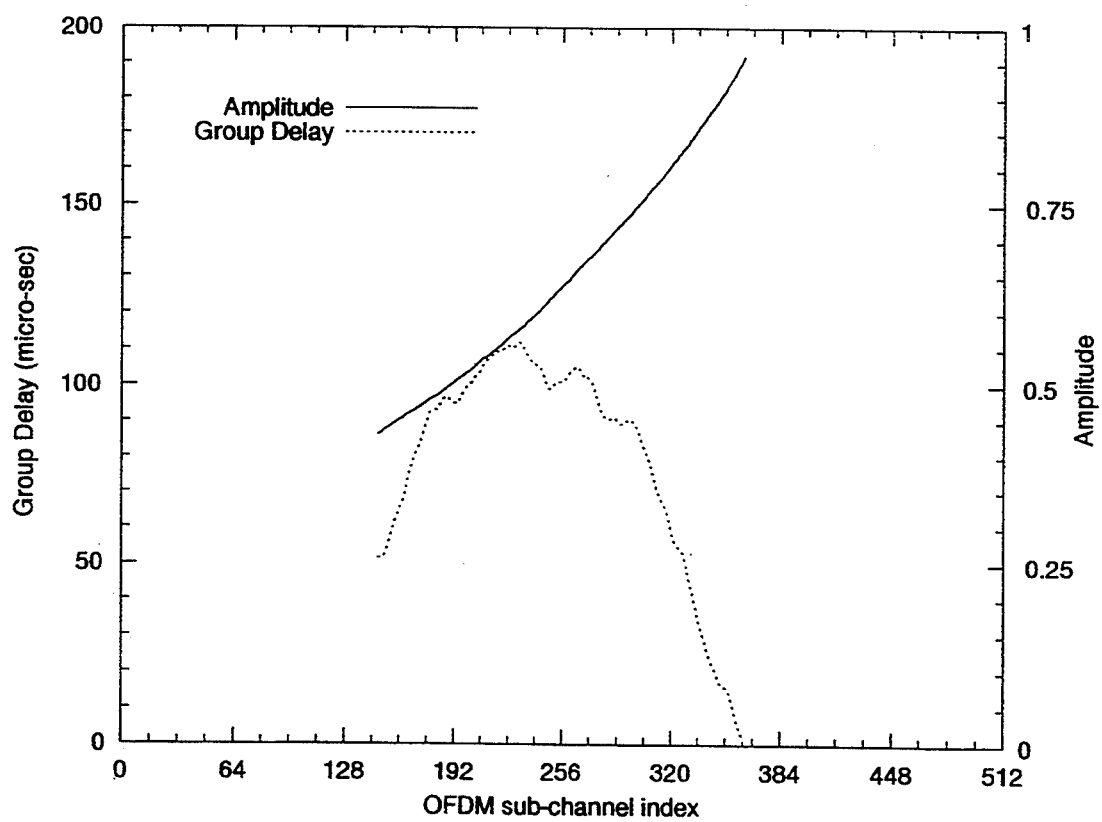
FIG. 15 is a graph showing amplitude and group delay corrections for channel equalization in a test system according to the invention.

Determination of the proper equalization may be made through a training sequence procedure using a loop-back configuration. The loop-back configuration achieves perfect synchronization because a single host computer and a single DSP processor board act as both transmitter and receiver. The clock that is used to trigger D/A conversion for the transmitter also triggers A/D conversion for the receiver. The results for 10 transmissions of OFDM blocks generated from random data are processed and are shown in FIG. 15.

The equalized phasors and the synchronization reference phasors are used to calculate the correlation detector output as:

$$Y = \kappa \sum_{i=1}^{j} s_i \cdot r_i \quad (4)$$

where $s_i$ is the equalized phasor of the $i^{th}$ synchronization tone of the received signal, $r_i$ is the phasor of the $i^{th}$ synchronization tone of the reference signal, j is the number of synchronization tones used, · is the dot product, and K is a constant.

The correlation detector provides snapshots, spaced at intervals equal to the sample period, of the continuous-time correlation between the received and reference synchronization signals. If the correlation function varies rapidly around its peak (this variation increases with the number of synchronization sub-carriers), the correlation detector output can be passed through a digital interpolation filter to obtain more frequent snapshots of the correlation and thus reduce the possibility of missing the correlation peak.

For example, a 63 tap finite impulse response low pass filter may be used to provide interpolated data values at four times the original data rate. As described in Warner OFDM/FM frame synchronization for mobile radio data communication, M.A.Sc. thesis, University of British Columbia, 1991, which is incorporated herein by reference, this is sufficient to insure that the peak is detected to within 95% of its actual value.

Phase III-Fine Synchronization

Figure 16:
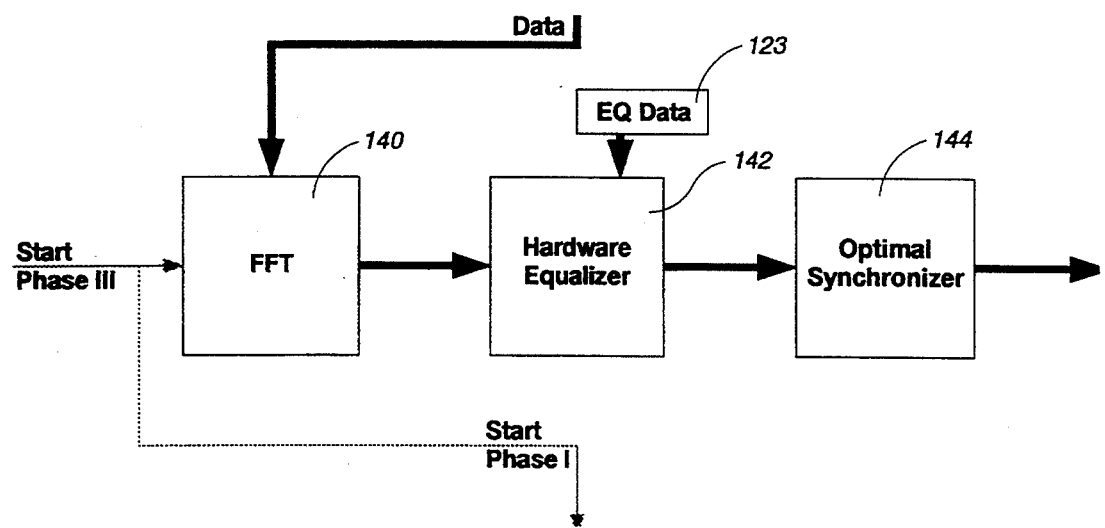
FIG. 16 is a block diagram illustrating the technique for achieving fine synchronization according to the invention.

Since Phase II achieves synchronization to within $\pm\frac{1}{2}$ of a sample period, it is guaranteed that the data frame pointed to by data index calculator 130 at the start of Phase III will be within the un-weighted extensions of the OFDM data frame. As shown in FIG. 16, in Phase III, an FFT 140 is first performed on the received data frame. The output of FFT 140 is a series of phasors that represent the uncorrected phase and amplitude of each of the sub-channels in the OFDM signal. All sub-channels of the OFDM signal are then equalized (step 142) to compensate for the known phase and magnitude distortions of the communications channel using equalization information 123. Finally, fine synchronization is performed on the resulting set of data. Fine synchronization involves calculating a time shift, $\tau$, that maximizes the correlation $r_s(\tau)$ of the received signal s(t) with the reference synchronization signal r(t). The phase of each of the phasors is then adjusted by adding $\omega_i\tau$ to the phase of each equalized phasor.

Since Phase II achieves synchronization to within half a sample period, we are interested only in evaluating the correlation over a small range of the scanning parameter $\tau$. In this case, a relatively simple expression for $r_s(\tau)$ can be obtained as described by Warner, OFDM/FM frame synchronization for mobile radio data communication, M.A.Sc. thesis, University of British Columbia, 1991, namely:

$$r_s(\tau) = \frac{T}{2} \sum_{i=1}^{J} \cos(\omega_i \tau + \theta_i) \quad (5)$$

where $\omega_i$ is the angular frequency of the $i^{th}$ sync tone and $\theta_i$ is the phase difference between the $i^{th}$ received and reference synchronization tones. The summation is made over the J synchronization tones. The derivative of $r_s(\tau)$ is given by:

$$\frac{d\,r_s(\tau)}{d\tau} = -\frac{T}{2} \sum_{i=1}^{J} \omega_i \sin(\omega_i \tau + \theta_i) \quad (6)$$

For most acceptable IF SNR values, we would expect $(\omega_i \tau + \theta_i)$ to be small. In such cases, from Equation (6) we can write:

$$\frac{d\,r_s(\tau)}{d\tau} \approx -\frac{T}{2} \sum_{i=1}^{J} \omega_i (\omega_i \tau + \theta_i) \quad (7)$$

The time shift $\tau^*$ for which the derivative is zero then satisfies:

$$0 \approx -\frac{T}{2} \sum_{i=1}^{J} \omega_i (\omega_i \tau^* + \theta_i) \quad (8)$$

so that $$\tau^* \approx -\frac{\sum_{i=1}^{J} \omega_i \theta_i}{\sum_{i=1}^{J} \omega_i^2} \quad (9)$$

The required phase shift for each sub-channel is then calculated from the time-shift $\tau^*$ and applied to each sub-carrier before extracting the encoded data in the OFDM signal. As noted above, digital data is encoded in the phases and amplitudes of data carrying sub-carriers in the OFDM signal. The phase of each data-carrying sub-carrier is corrected by adding a phase angle, $\delta_k$ given by the formula $\delta_k = \omega_i \tau^*$ to the phase of the sub-carrier, where $\omega_i$ is the frequency of the sub-carrier. The digital data can then be decoded using the corrected phases of the data-carrying sub-carriers.

The performance of Phase III can be measured by comparing the BER resulting from the fine tune synchronization of Phase III with the BER that could be obtained assuming ideal synchronization. Some typical results of such testing are shown in FIGS. 17 and 18.

Figure 17:
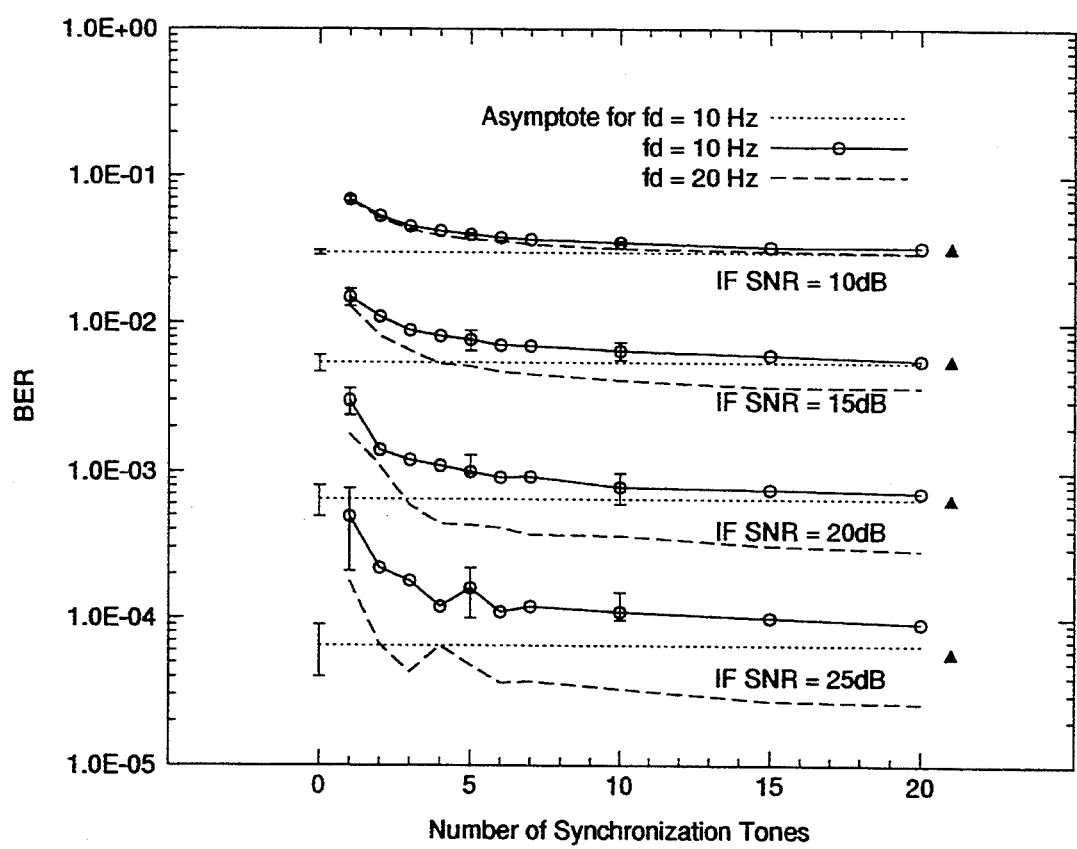
FIGS. 17 and 18 are plots showing the relationship between Bit Error Rate and the number of tones used for synchronization at various signal levels in a communications channel according to the invention.
Figure 18:
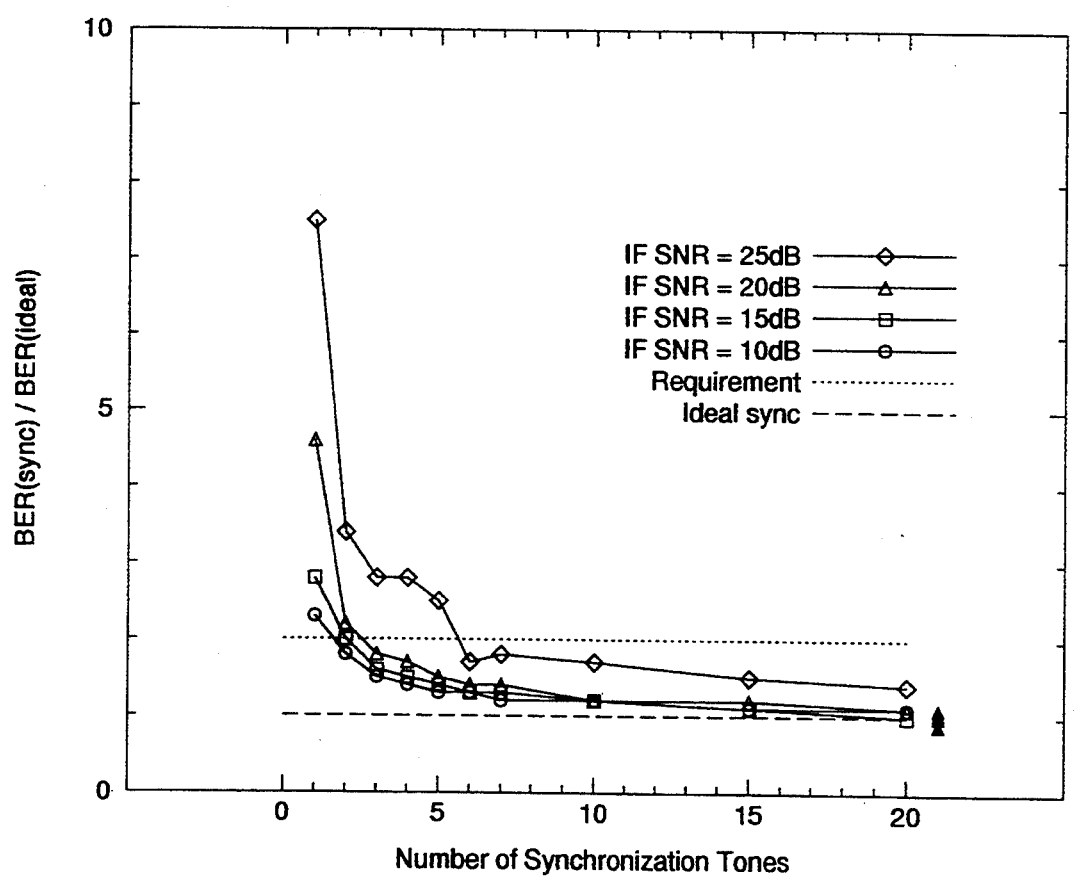

In FIG. 17, the dotted curves represent the best achievable BER for a Doppler rate of 10 Hz, obtained when ideal synchronization is achieved. FIG. 18 displays the same data as FIG. 17 but as a ratio of actual BER compared to the BER for ideal synchronization. Except for the case of IF SNR=25 dB, the relative results are quite similar. Also shown is a typical BER performance requirement curve. In general, fine tune synchronization improves as the number of synchronization tones is increased. The rate of improvement is greatest when the number of tones is small. When 6 or more synchronization tones are used, the performance of the fine tune algorithm exceeds the requirements.

The effect of increasing the Doppler rate is shown in FIG. 17 by the dashed lines. Negligible improvement results for IF SNR=10 dB. The degree of improvement increases with increasing IF SNR. For IF SNR=25 dB, increasing the Doppler rate from 10 Hz to 20 Hz reduces the BER by a factor of 3 when 7 or more synchronization tones are used.

Figure 19:
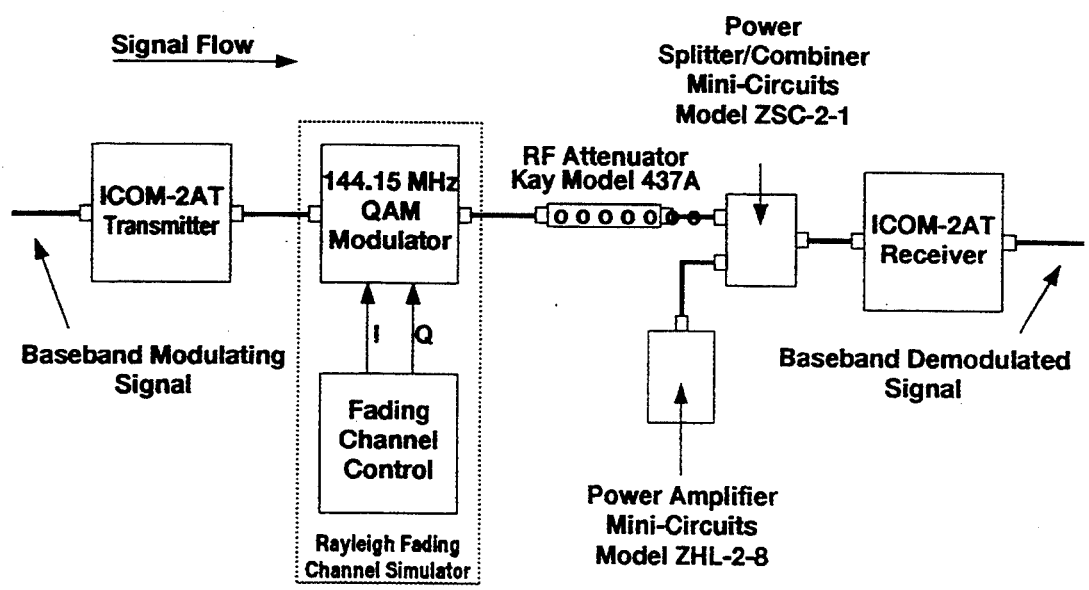
FIG. 19 is a block diagram of a laboratory system for simulating an FM fading channel which may be used to test apparatus according to the invention.

Testing can be made with a Rayleigh fading channel simulator. FIG. 19 is a block diagram of apparatus for simulating a FM fading channel. In FIG. 19, a baseband signal is used to modulate an ICOM-2AT FM transmitter. The RF signal is passed through a Rayleigh fading channel simulator as described by Casas et al. A simple digital fading simulator for mobile radio IEEE Transactions on Vehicular Technology, vol. 39, p. 205, August, 1990 which is incorporated herein by reference. The output from the fading simulator is passed through a step-wise variable attenuator and combined with the output of an RF noise source. The output of the power combiner is connected to the antenna input of an ICOM-2AT receiver.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for recovering data from a transmitted OFDM signal, said signal comprising a plurality of data sub-carriers, a plurality of synchronization sub-carriers, and phase-encoded digital data associated with said data carrying sub-carders said method comprising the steps of:
   a. determining the approximate start of said signal;
   b. when said approximate start of said signal is determined, taking samples of said signal at a frequency of at least twice the frequency of any of said sub-carriers for a time period;
   c. storing said samples in a data buffer;
   d. taking groups of said samples, each of said groups comprising a plurality of consecutive ones of said samples, and, for each of said groups, calculating a correlation between said group and a reference signal;
   e. selecting one of said groups for which said correlation is greatest;
   f. deriving the phase and amplitude of each of said data-carrying sub-carriers in said signal by calculating the fast fourier transform of said selected one of said groups;
   g. deriving adjusted phases for said data-carrying sub-carriers by adding a phase angle $\omega_k \tau^*$ to said phase of each of said data-carrying sub-carriers where $\omega_k$ is the frequency of the $k^{th}$ sub-carrier, and $\tau^*$ is a time-shift to maximize the correlation of said synchronization sub-carriers with said reference signal; and
   h. decoding said data from said adjusted phases and said amplitudes of said data-carrying sub-carriers.

2. The method of claim 1 wherein $\tau^*$ is calculated according to:

$$\tau^* \approx - \frac{\sum\limits_{i=1}^{J} \omega_i \theta_i}{\sum\limits_{i=1}^{J} \omega_i^2}$$

where $\theta_i$ is the phase difference between an $i^{th}$ one of said synchronization sub-carriers and a corresponding sub-carrier in said reference signal and J is the number of said synchronization sub-carriers.

3. The method of claim 2 wherein said correlation is calculated in the frequency domain.

4. The method of claim 3 wherein said reference signal is a series of phasors representing the phases and amplitudes of said synchronization tones.

5. The method of claim 1 wherein said OFDM signal is an OFDM/FM signal.

6. The method of claim 1 wherein said OFDM signal is an OFDM/SSB signal.

7. The method of claim 1 wherein said OFDM signal is an OFDM/AM signal.

8. The method of claim 1 wherein said OFDM signal is an acoustic signal.

9. Apparatus for recovering data from a transmitted OFDM signal, said signal comprising a plurality of data sub-carriers, a plurality of synchronization sub-carriers, and phase-encoded digital data associated with said data carrying sub-carriers, said apparatus comprising:
 a. a receiver for receiving said transmitted OFDM signal, said receiver having an audio frequency output;
 b. threshold detection means for detecting when a signal is being received by said receiver;
 c. analog to digital conversion means for taking digital samples of said audio frequency output at a sampling frequency;
 d. data buffer means for storing said digital samples;
 e. correlation detection means for sequentially taking groups of said store digital samples, each of said groups comprising a plurality of Sequential ones of said stored digital samples and providing an output representing a correlation between said groups and a reference signal;
 f. peak detection means for monitoring said output of said correlation detector means and detecting a peak in said output;
 g. data index calculating means associated with said correlation detection means and said peak detection means for providing a pointer to the start of a selected one of said groups of sequential stored digital samples corresponding to sad peak;
 h. calculation means for:
  i. calculating estimated phases and amplitudes of said synchronization sub-carriers in said transmitted OFDM signal by calculating the fourier transform of said selected one of said groups;
  ii. calculating a time-shift to maximize the correlation between said reference signal and said selected one of said groups of stored digital samples from said estimated phases;
  iii. calculating estimated phases and amplitudes of said data-carrying sub-carriers by calculating the fourier transform of said selected one of said groups;
  iv. calculating corrected phases of said data-carrying sub-carriers by calculating and adding to said estimated phases phase angles resulting from said time-shift;
  i. decoding means for recovering said phase-encoded digital data from said corrected phases; and
  j. a data output.

10. The receiver of claim 9 wherein said reference signal is a series of phasors stored in a data buffer.

11. A method for communicating from a transmitter to a receiver digital data comprising a series of binary elements said method comprising the steps of:
 a. providing an OFDM channel comprising a plurality of orthogonal frequency sub-carriers, said sub-carriers comprising a first group reserved for synchronization tones having predetermined phases and amplitudes and a second group reserved for carrying data;
 b. breaking said data into blocks of said binary elements;
 c. independently, for each of said blocks:
  i. encoding said binary elements in said block in the phases of said second group of sub-carriers;
  ii. transmitting an OFDM signal comprising said first group of sub-carriers broadcast simultaneously with said second group of sub-carriers for a time period;
  iii. receiving said OFDM signal at said receiver;
  iv. measuring phases of said first and second groups of sub-carriers in said received OFDM signal;
  v. deriving a time-shift to maximize a correlation between said first group of sub-carriers and a reference signal;
  vi. obtaining corrected phases for said second group of sub-carriers by, for each sub-carrier in said second group of sub-carriers, adding a phase angle calculated from said time-shift to said measured phase of said sub-carrier; and
  vii. decoding said data using said corrected phases of said second group of sub-carriers.

12. The method of claim 11 wherein there are J synchronization tones and J is an integer in the range of 6 to 25.

13. The method of claim 11 wherein said time shift is calculated according to the formula:

$$\tau^* \approx - \frac{\sum\limits_{i1}^{J} \omega_i \theta_i}{\sum\limits_{i1}^{J} \omega_i^2}$$

where $\tau^*$ is said time-shift, $\theta_i$ is the phase difference between an $i^{th}$ one of said first group of sub-carriers and a corresponding sub-carrier in a reference signal and J is the number of sub-carriers in said first group of sub-carriers.

14. The method of claim 13 wherein, for each sub-carrier in said second group of sub-carriers, said phase angle is calculated according to the formula $\delta_k = \omega_k \tau^*$ where $\delta_k$ is the phase angle for the $k^{th}$ sub-carrier in said second group of sub-carriers and $\omega_k$ is the frequency of the $k^{th}$ sub-carrier in said second group of sub-carriers.

15. The method of claim 11 where said step of encoding said binary elements comprises breaking said block of binary elements into groups of binary elements and encoding each of said groups of binary elements into the phase of one sub-carrier of said second group of sub-carriers.

16. The method of claim 15 wherein each of the said groups of binary elements is encoded as a point in a $2^m$-QAM constellation.

* * * * *

UNITED STATES PATENT AND TRADEMARK OFFICE
CERTIFICATE OF CORRECTION

PATENT NO. : 5,444,697
DATED : 22 August, 1995
INVENTOR(S) : Cyril S. LEUNG and William D. WARNER It is certified that error appears in the above-indentified patent and that said Letters Patent is hereby corrected as shown below:

On the cover page, in the given name of the first inventor, replace "Cybil" with --Cyril--;
On the cover page, in the list of U.S. patent references cited, replace "5,191,576  3/1993 Prommier et al." with --5,191,576  3/1993 Pommier et al.--;
On the cover page, in the list of Other Publications cited, left column, second line, replace "orthagonally" with --orthogonally--;
On the cover page, in the list of Other Publications cited, left column, fifth and sixth lines, replace "Orthagonal" with --Orthogonal--;
On page 2, in the list of Other Publications cited, left column, second and third lines, replace "IEEE Transactions on Communication" with --IEEE Transactions on Communications--;
On Page 2, in the list of Other Publications cited, left column, tenth line, replace "FMChannels" with --FM Channels--;
On Page 2, in the list of Other Publications cited, left column, seventeenth line, replace "P. M. Egert" with --P.M. Ebert--;
On Page 2, in the list of Other Publications cited, right column, seventh line, replace "communiction" with --communication--;
On page 2, in the list of Other Publications cited, right column, seventh line, replace "receivers" with --transmitters--;
On page 2, in the list of Other Publications cited, right column, eighth line, replace "25-947" with --25-470--;
In the Abstract, 11th line, replace "ODFM" with --OFDM--;
In column 2, at lines 25, 27, 31, and 41 replace " m " with -- $m$ --;
In column 5, line 34, replace "flames" with --frames--;
In column 6, at lines 42 and 45, replace " m " with -- $m$ --.

UNITED STATES PATENT AND TRADEMARK OFFICE
CERTIFICATE OF CORRECTION

PATENT NO. : 5,444,697
DATED : 22 August, 1995
INVENTOR(S) : Cyril S. LEUNG and William D. WARNER It is certified that error appears in the above-indentified patent and that said Letters Patent is hereby corrected as shown below:

In column 9, line 53, replace "as $f$" with --as $f^2$--;
In column 10, line 50, replace "synchronization" with --Synchronization--;
At column 11, line 27 replace "side lobe" with --side-lobe--;
In column 14, line 36, replace "+45" with --±45--;
In column 15, line 12, replace "bet-ween" with --between--;
In column 16, amend equation(4) to read as follows:

$$Y = \sum_{i=1}^{j} s_i \odot r_i \qquad (4)$$

In column 16, line 25, replace " is the dot" with --⊙ is the dot--;
In column 16, line 26, replace "K" with --κ--;
In column 16, line 61, replace " $_{rs}(\tau)$" with --$\mathbb{R}_{rs}(\tau)$--;
In column 17, line 1, replace " $_{re}(\tau)$" with --$\mathbb{R}_{rs}(\tau)$--;
In column 17, amend equation (5) to read as follows:

$$\mathbb{R}_{rs}(\tau) = \frac{T}{2} \sum_{i=1}^{J} \cos(\omega_i \tau + \theta_i) \qquad (5)$$

In column 17, line 13, replace " $_{rs}(\tau)$" with --$\mathbb{R}_{rs}(\tau)$--;

UNITED STATES PATENT AND TRADEMARK OFFICE
CERTIFICATE OF CORRECTION

PATENT NO. : 5,444,697
DATED : 22 August, 1995
INVENTOR(S) : Cyril S. LEUNG and William D. WARNER It is certified that error appears in the above-indentified patent and that said Letters Patent is hereby corrected as shown below:

In column 17, amend equation (6) to read as follows:

$$\frac{d\,\mathbb{R}_{rs}(\tau)}{d\tau} = -\frac{T}{2}\sum_{i=1}^{J} \omega_i \sin(\omega_i \tau + \theta_i) \qquad (6)$$

In column 17, amend equation (7) to read as follows:

$$\frac{d\,\mathbb{R}_{rs}(\tau)}{d\tau} \approx -\frac{T}{2}\sum_{i=1}^{J} \omega_i (\omega_i \tau + \theta_i) \qquad (7)$$

In column 17, line 45, replace "$\omega_i$" with --$\omega_k$--;
In column 17, line 46, replace "$\omega_i$" with --$\omega_k$--;
In column 18, line 36, replace "sub-carders" with --sub-carriers--;
In column 19, line 39, replace "store" with --stored--.
In column 19, line 40, replace "Sequential" with --sequential--.
In column 19, line 51, replace "sad" with --said--.
In claim 13, column 20, lines 42-47, amend the equation to read as follows:

$$\tau^* \approx -\frac{\sum_{i=1}^{J} \omega_i \theta_i}{\sum_{i=1}^{J} \omega_i^2}$$

In claim 15, column 20, line 59 replace "where" with --wherein--;

UNITED STATES PATENT AND TRADEMARK OFFICE
CERTIFICATE OF CORRECTION

PATENT NO. : 5,444,697
DATED : 22 August, 1995
INVENTOR(S) : Cyril S. LEUNG and William D. WARNER It is certified that error appears in the above-indentified patent and that said Letters Patent is hereby corrected as shown below:

In claim 16, column 20, line 65 replace "each of the said" with --each of said--;

In the drawings, Figure 1, the reference numeral 50 should be applied to the dashed outline surrounding the blocks designated "LPF Filter" and "Rx Gain", which are identified by reference numerals 52 and 53 respectively ; and, In the drawings, Figure 14, the reference numeral 129 should be applied to the arrow labelled "Stop" which extends between the block designated "Delay" and identified by reference numeral 128, and the block designated "Peak Detector" and identified by the reference numeral 126.

Signed and Sealed this

Sixteenth Day of July, 1996

*Attest:*

BRUCE LEHMAN

*Attesting Officer*          Commissioner of Patents and Trademarks